United States Patent [19]

Citron et al.

[11] Patent Number: 5,699,252
[45] Date of Patent: Dec. 16, 1997

[54] ERROR CORRECTION IN MEASURES OF SPEED, ACCELERATION, MISFIRE DETECTION AND ROUGHNESS

[75] Inventors: Stephen J. Citron, West Lafayette, Ind.; Jeffrey S. Armfield, Knoxville, Tenn.

[73] Assignee: Purdue Research Foundation, West Lafayette, Ind.

[21] Appl. No.: 307,846
[22] PCT Filed: Mar. 29, 1993
[86] PCT No.: PCT/US93/03121
§ 371 Date: Apr. 7, 1995
§ 102(e) Date: Apr. 7, 1995
[87] PCT Pub. No.: WO93/20427
PCT Pub. Date: Oct. 14, 1993

Related U.S. Application Data

[63] Continuation-in-part of Ser. No. 859,840, Mar. 30, 1992, abandoned.

[51] Int. Cl.$^6$ ................................................ G01M 15/00
[52] U.S. Cl. ........................... 364/431.08; 364/551.01
[58] Field of Search ..................... 73/660; 364/431.01, 364/431.03, 431.04, 431.07, 431.08, 511, 551.01

[56] References Cited

U.S. PATENT DOCUMENTS

| | | |
|---|---|---|
| 3,972,230 | 8/1976 | Hanson et al. . |
| 4,179,922 | 12/1979 | Bouverie et al. . |
| 4,398,259 | 8/1983 | Levine . |
| 4,403,505 | 9/1983 | Hattori et al. . |
| 4,532,592 | 7/1985 | Citron et al. . |
| 4,691,288 | 9/1987 | Kay et al. . |
| 5,041,980 | 8/1991 | Maddock et al. . |
| 5,044,194 | 9/1991 | James et al. . |
| 5,044,195 | 9/1991 | James et al. . |
| 5,056,360 | 10/1991 | Dosdall et al. . |
| 5,095,742 | 3/1992 | James et al. . |
| 5,109,695 | 5/1992 | James et al. . |
| 5,117,681 | 6/1992 | Dosdall et al. . |
| 5,287,735 | 2/1994 | Klauber et al. ............................ 73/660 |
| 5,440,922 | 8/1995 | Ichikawa ............................ 364/431.08 |
| 5,447,061 | 9/1995 | Fujiki ................................. 364/431.07 |
| 5,499,537 | 3/1996 | Nakayama et al. ................. 364/431.08 |

OTHER PUBLICATIONS

Society of Automotive Engineers Paper, SAE 900232, Plapp et al., 1990.
Society of Automotive Engineers Paper, SAE 901768, Ribbens, et al., 1990.
Society of Automotive Engineers Paper, SAE 920236, Klauber et al., 1992.

*Primary Examiner*—James P. Trammell
*Assistant Examiner*—Craig Steven Miller
*Attorney, Agent, or Firm*—Barnes & Thornburg

[57] ABSTRACT

Methods are presented to remove from misfire/roughness measures both acceleration effects and those errors which are of a cyclical nature over the engine firing cycle. Included in the latter category are errors which repeat every revolution, e.g. tooth spacing errors resulting from manufacturing tolerances on a multitoothed wheel used to measure speed. Also included are errors arising from the cylinder by cylinder variations occurring in one firing cycle which would be essentially the same in neighboring firing cycles, e.g. mechanical and electrical tolerance effects that are cylinder based. These methods permit the correction in each cylinder measure of such cyclic errors on a cycle basis, i.e., after the completion of one or more of the cycles causing the error, or on a cylinder by cylinder basis, i.e., after the completion of the interval associated with an individual cylinder. The methods permit the correction of speed on a tooth by tooth basis in the same manner that the misfire/roughness measures are corrected on a cylinder by cylinder basis. In this way, the corrected speed forms the basis for determining corrected acceleration measures on a tooth by tooth basis.

31 Claims, 14 Drawing Sheets

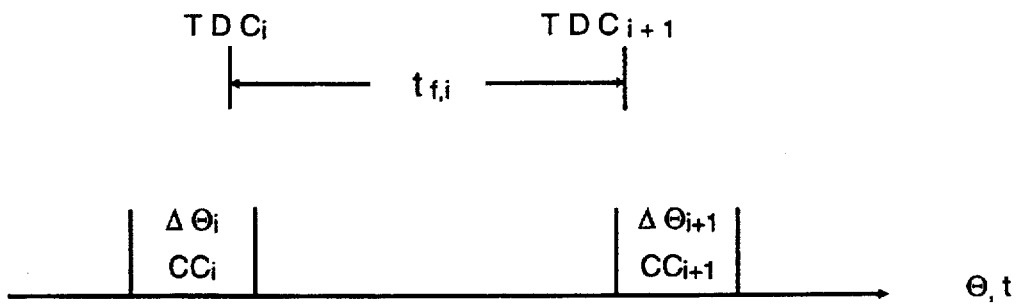

| $CC_i$ | CLOCK COUNTS IN THE MEASUREMENT INTERVAL ASSOCIATED WITH $TDC_i$ |
|---|---|
| $CC_{i+1}$ | CLOCK COUNTS IN THE MEASUREMENT INTERVAL ASSOCIATED WITH $TDC_{i+1}$ |
| $\Delta\Theta_R$ | THE DESIGNED MEASUREMENT INTERVAL ABOUT EACH TDC |
| $\Delta\Theta_i$ | THE ACTUAL MEASUREMENT INTERVAL AT $TDC_i$ |
| $\Delta\Theta_{i+1}$ | THE ACTUAL MEASUREMENT INTERVAL AT $TDC_{i+1}$ |
| $f_{CLK}$ | THE CLOCK FREQUENCY IN CLOCK COUNTS/SEC. |
| $t_{f,i}$ | THE TIME INTERVAL BETWEEN $TDC_i$ AND $TDC_{i+1}$, OR APPROXIMATELY THE TIME BETWEEN TIMING MARKS ASSOCIATED WITH THE I'TH TDC MEASUREMENT INTERVAL |

FIG. 5

ERROR CORRECTION IN MEASURES OF SPEED, ACCELERATION, MISFIRE DETECTION AND ROUGHNESS

This is a continuation-in-part application of U.S. application Ser. No. 07/859,840 filed Mar. 30, 1992 (now abandoned).

TECHNICAL FILED AND INDUSTRIAL APPLICABILITY

This invention relates to internal combustion engines and more specifically to the removal of acceleration effects and the correction of cyclical errors that occur in the detection of misfits/roughness in an internal combustion engine. The methods according to the invention can also be applied to the determination of speed and acceleration measures corrected for cyclic errors for other purposes, such as, for example, precision spark advance control, adaptive braking control, and automatic transmission control.

BACKGROUND ART

In the recent past, Federal regulations have restricted the amount of pollutants that may be emitted into the atmosphere by an automobile. One method of meeting these restrictions is the use of a catalytic converter in the exhaust system which converts harmful exhaust emissions into harmless products. However, when a cylinder does not fire properly, raw fuel may be dumped into the exhaust system and thus into the catalytic converter. Due to the temperatures in the exhaust/catalyst, the raw fuel may ignite and cause irreparable damage to the converter's ability to reduce exhaust emissions. Even should burning not occur, the catalyst's ability to function properly may be inhibited if the air/fuel mixture deviates substantially from stoichiometry. To protect the catalyst, it is advantageous then to be able to detect when cylinders misfire so that appropriate steps can be taken.

In the course of normal operation of an internal combustion engine, engine torque fluctuations about a mean level occur as a result of the summed effect of the torque production in individual cylinders and the mechanics of the torque production process. These torque fluctuations give rise to engine speed fluctuations which can be monitored and used, on a cylinder by cylinder basis, to gain a measure of the mean torque produced by the engine. Also available on a cylinder by cylinder basis is a separate measure of the average net torque over the firing interval of any cylinder. Net torque, as used herein, means the difference between the torque produced by the engine and the load on the engine. With an accurate measure of the average net torque over a cylinder firing interval, a misfiring cylinder can be detected.

In Citron et al, U.S. Pat. No. 4,532,592, an index of performance, IP, is calculated for each cylinder. The IP is the difference in measures of the speed at top dead center, TDC, for two successive cylinders. An acceleration measure is formed from these two speed measures to normalize the result with respect to engine speed. It is shown that the index of performance is directly proportional to the integrated net torque over the firing interval of the first cylinder. The method disclosed in U.S. Pat. No. 4,532,592 provides for use of the index of performance in an engine performance monitor and control system. The method assumes that the engine is operating at steady state. When the engine is not at steady state the contribution of the acceleration to each speed measure at TDC must be removed.

To obtain the sharpest measure of the associated steady state speed at TDC, and hence the best measure of the mean pressure torque variation on a cylinder by cylinder basis, not only must acceleration effects be removed, but account must be taken of the fact that measurement errors exist. For example, tooth spacing error on the toothed wheel from which raw IP data is obtained must be taken into account. U.S. Pat. No. 4,532,592 assumes that digital filtering of the speed waveform will be employed, if required, to remove such effects. That the magnitude of these errors is significant is demonstrated by FIG. 1, which shows results from rotating an 18 tooth speed measurement wheel from a vehicle on a lathe at a constant 2500 rpm. Note that the tooth spacing errors cause a 2% peak to peak error in the calculated speed. The calculated speed is determined by assuming position measures of the 18 teeth are evenly spaced 20 degrees apart, and counting the clock counts that occur between passage of the position measures of the teeth past a reference point.

In Dosdall et al, U.S. Pat. No. 5,056,360, a misfire detection process is presented which uses speed measures over a wide angle, approximately the firing angle, essentially centered at TDC. The speed measures are then differenced to form acceleration measures. No correction is made for tooth errors or other cyclical effects.

In James et al, U.S. Pat. Nos. 5,044,195 and 5,044,194, corrections are made for acceleration which do not recognize the cyclical nature of the speed measurements over successive firing cycles that result from tolerance effects that repeat each firing cycle.

In Plapp et al., Society of Automotive Engineers Paper SAE 900232, 1990, a methodology is presented for misfire detection based on crankshaft speed fluctuations. Testing of the algorithm shows it to be unsatisfactory under light loads. Table 1 illustrates that the algorithm presented by Plapp, et al. cannot reliably distinguish normal operation in neutral gear from the case of a single cylinder continuously misfiring. The misfire index for normal operation exceeds that occurring under continuous misfire of a single cylinder.

In Klauber et al., Society of Automotive Engineers Paper SAE 920236, 1992, on misfire detection via use of a magnetostrictive misfire sensor, crankshaft speed fluctuation based misfire detection work of Ribbens et al., in SAE 901768, 1990, is referenced. Klauber et al., note that the California Air Resources Board intends to require misfire detection with the transmission disengaged for reasonably high shaft speeds, i.e., from 4,000 to 5,000 RPM. No researchers known to Klauber et al., have had, prior to the date of Klauber et al., reported success under these conditions using crankshaft speed fluctuations detection methods.

DISCLOSURE OF THE INVENTION

Since the crankshaft speed slowdown during misfire is relatively small, on the order of 2% or less, it is clear that care must be taken in forming the acceleration measures used for misfire/roughness detection. At the same time, while the importance of some errors, e.g. tooth errors, can be lessened by using wide measurement angles, the cost is that the misfire/roughness measure is less robust, less sharp, i.e. has a smaller signal to noise ratio. For example, simulation results show that using a 20 degree measurement interval centered about TDC provides a misfire measure more than 25% larger than that obtained using the 120 degree measurement angle from 70 degrees BTDC to 50 degrees ATDC as recommended by U.S. Pat. No. 5,056,360. See Table 2, which provides index of performance results of simulations of the operation of a 6 cylinder engine with the first cylinder in the firing order (#1) continuously misfiring. These simulations were conducted with several window angles about TDC: −10° to +10°; −60° to 60°; −70° to +50°; and −50° to +70°. Engine tests confirm the simulation results and show, in addition, a sharp reduction in noise can be achieved by using the process of the invention. This is quite important since, to avoid false indications of misfire, a misfire index should have the largest spread between values obtained under normal (i.e., non-misfire) operation and those obtained with misfire.

According to one aspect of the invention, a method is provided by which acceleration effects are removed from index of performance calculations.

According to another aspect of the invention, a method is provided by which tooth error and other cyclical effects are removed from index of performance calculations.

BRIEF DESCRIPTION OF THE DRAWINGS

The invention may be understood by referring to the following description and accompanying drawings which illustrate the invention. In the drawings:

FIG. 5 illustrates the measurement intervals $\Delta\theta_i$ and $\Delta\theta_{i+1}$ about $TDC_i$ and $TDC_{i+1}$, as well as the time interval $t_{r,i}$ between the TDC points. The angles $\Delta\theta_i$ and $\Delta\theta_{i+1}$ are arrayed linearly. $CC_i$ and $CC_{i+1}$ are the clock counts measured in each measurement interval; and, FIGS. 6–15 illustrate flow diagrams of methods according to the present invention.

MODES FOR CARRYING OUT THE INVENTION

Figure 1:
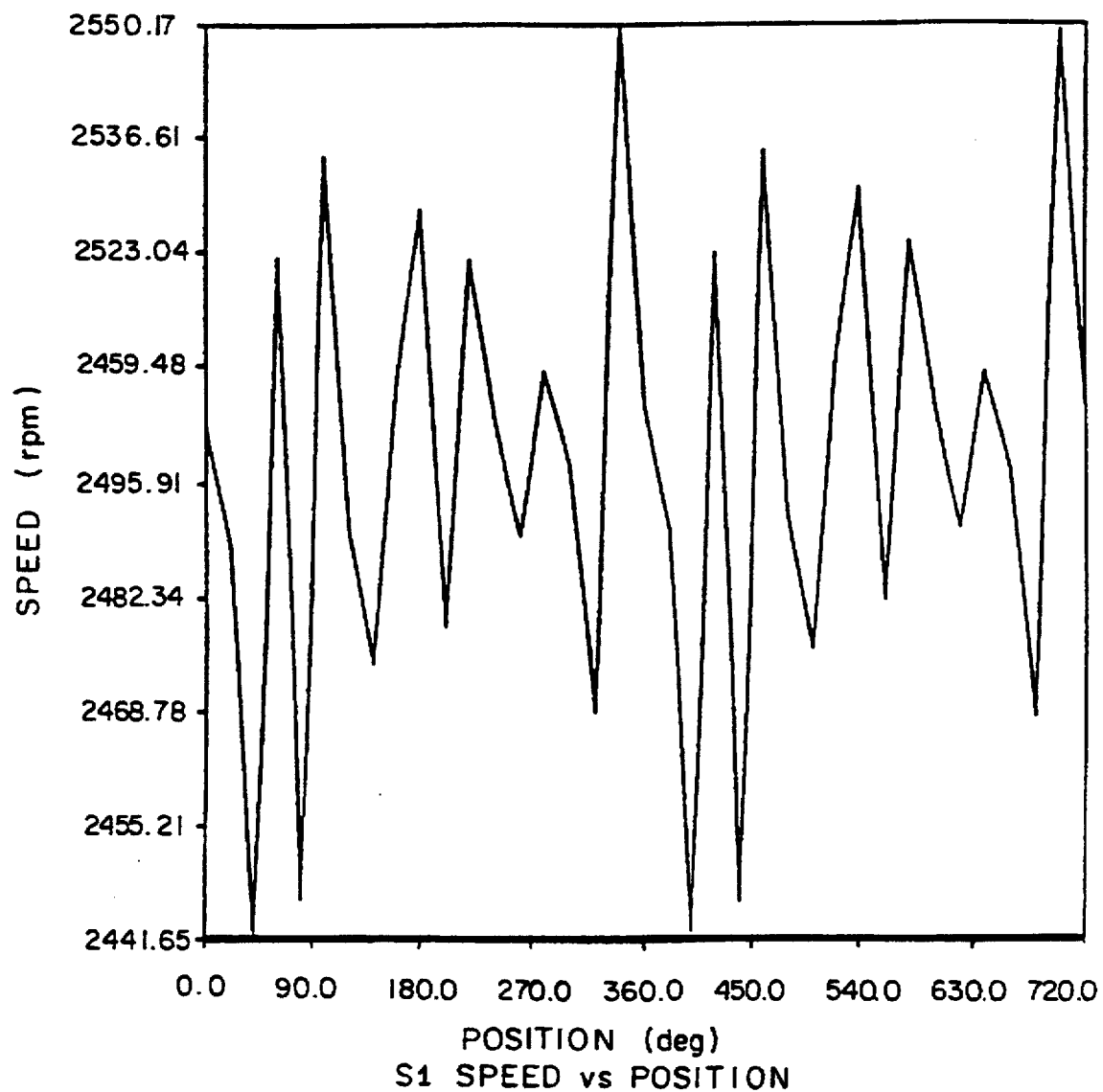
FIG. 1 illustrates indicated speed in revolutions per minute versus wheel angle in degrees, measured from an arbitrary zero degree reference of a typical 18-tooth wheel from an automobile manufacturer spun on a lathe at a controlled 2500 rpm.

To illustrate, employing a vehicle with a 6 cylinder engine results without misfire are compared with those obtained for continuous misfire of cylinder #1 using both a wide speed measurement window about TDC, (120 degrees), and a narrow window about TDC, (20 degrees). This is first done without using the cyclic error correction process of the invention. Results are then obtained and compared using the error correction process of the invention. The above comparisons, illustrated in Tables 3–10, all employ the acceleration correction process of the invention. Engine operation at 2000 rpm with the transmission in neutral is used as the operating point.

Results obtained using the wide angle window of 120 degree about TDC, and not using the error correction process of the invention, are presented in Tables 3 and 4. The more negative the index, the greater the indication of misfire. Table 3 illustrates that during normal operation without misfire an IP value as negative as −43.09 occurs, while during continuous misfire of cylinder #1, Table 4 illustrates no IP of cylinder #1 less negative than −48.74. Thus a ratio of the indices during misfire to normal operation of 48.74/43.09=1.13 exists.

Continuing to use the wide angle measurement window, Tables 5 and 6 illustrate the results of employing the error correction process of the invention. In Table 5, it can be seen that when running without misfire, but using error correction, the most negative IP is −31.26. During continuous misfire, Table 6 illustrates the least negative IP of cylinder #1 to be −43.40. The ratio of the misfire to normal operation indices under these conditions is thus 43.40/31.26=1.39. Using the error correction process, a 23% gain ((1.39/1.13)×100%) in the margin between misfire and normal operation indices has been obtained.

In Tables 7–10, the same comparisons are made using the narrow measurement window of 20 degrees about TDC. Without misfire and without error correction, Table 7 illustrates that during normal operation a value of IP for cylinder #1 as negative as −76.10 occurs. During continuous misfire of cylinder #1, Table 8 illustrates no IP of cylinder #1 less negative than −42.83. Thus the ratio of the indices during misfire to normal operation is 42.83/76.10=0.56. Using the narrow window without error correction, no margin exists between the indices of misfiring operation and those obtained during normal operation.

Employing the error correction process with the narrow window, Table 9 illustrates that during normal operation without misfire a value of IP for cylinder #1 as negative as −37.92 occurs. During continuous misfire of cylinder #1 Table 10 illustrates no IP of cylinder #1 less negative than −62.30. Thus the ratio of the indices during misfire to normal operation is 62.30/37.92=1.64. Employing the error correction process and the narrow window, a large margin can now be obtained between misfire and normal operation indices. Indeed the ratio of 1.64 is some 18% larger ((1.64/1.39× 100%) than that obtained using the wide window and the correction process. The results confirm the gains predicted by the simulation and verify the value of the correction process. Thus, as a result of the increased signal and decreased noise, the signal to noise ratio for misfire detection is greatly enhanced employing the invention.

Using the method of the invention, tests have been run on a vehicle with a 6 cylinder engine at 5,000 RPM with the transmission in neutral. The results are illustrated in Tables 11—13. Recall that IP is the misfire detection index, where the more negative the index the greater the indication of misfire. Table 11 illustrates that when running without misfire, i.e. normal operation, the level of IP is around −20. In Table 12 in the presence of continuous misfire of cylinder #1, the detection index is more negative than −100 and correctly identifies cylinder #1 as the misfiring cylinder. At the same time the second most negative index in any cycle is on the order of −20, providing excellent discrimination. The case of a single, isolated cylinder #1 misfire is illustrated in Table 13. Cylinder #1 is identified as misfiring in cycles 10 and 11 with indices of −97 and −113. Again, discrimination from non-misfiring cylinders and cycles is excellent.

According to one aspect of the invention, measures are formed of the speed of the crankshaft over an interval, with each measure associated with a cylinder in the firing cycle. For example, these measures are nominally measures of the speed of the crankshaft at the top dead center point prior to the start of the power stroke of a particular cylinder. These speed measures are then corrected for acceleration. The acceleration correction uses two speed measures of the same cylinder, the speed measures being taken a firing cycle apart, to calculate a speed correction to be used to modify the intervening speed measures. When the acceleration corrections are conducted in this manner, there is no acceleration correction for any speed variations that are cyclical over the firing cycle.

Using the acceleration corrected measures of the speed, an index of performance for each cylinder is then calculated according to U.S. Pat. No. 4,532,592. If the speed measures are measures of the speed at TDC, then the index of performance is a measure of the integrated net torque over a cylinder's firing interval. For a misfiring cylinder, the net torque measure will have a relatively high-magnitude negative value, which is reflected in the cylinder's index of performance. An additional benefit of this process is that by differencing speed measures a firing interval apart, e.g. TDC to TDC, inertial torque effects are eliminated. Inertial torque effects, as used herein, means those torque effects resulting from the changing direction of motion of the reciprocating components of the engine, i.e. the piston assembly. This follows since the inertial torque has an average value of zero over a firing interval, i.e. in-the interval 720/N, where N is the number of cylinders in the engine. The elimination of inertial torque effects is of particular importance at high engine speeds.

Figure 6:
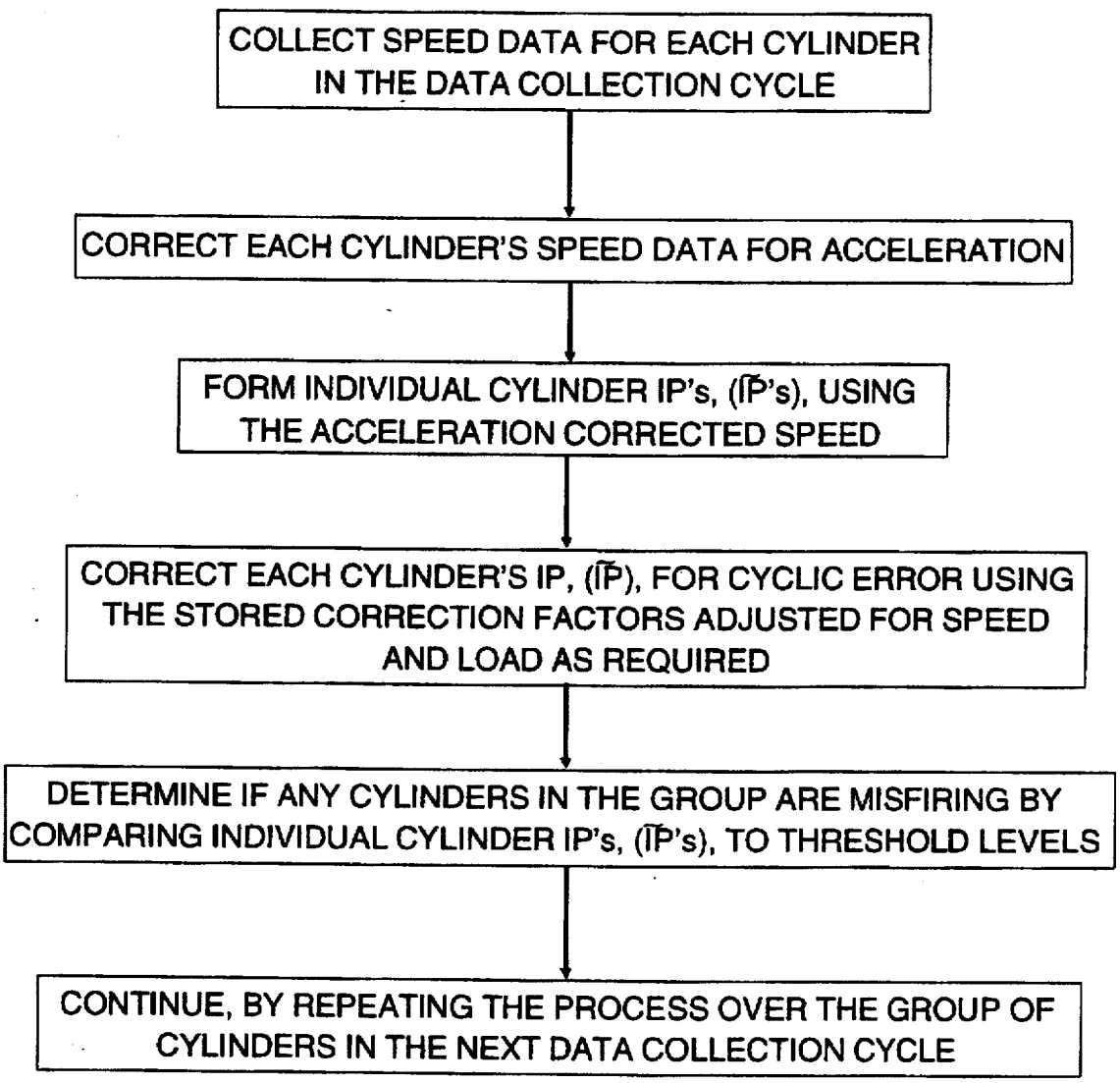

Determination of Misfire for All Cylinders in the Data Cycle As a Group—Cyclical Error Correction After Determination of IP's With reference to FIG. 6, in addition to removing acceleration effects, the present invention also removes the effects of cyclical sources of error. The net result is excellent signal-to-noise performance for misfire detection.

The use of a toothed wheel and signal pickup to obtain a measure of the speed at each TDC requires knowledge of the measurement angle interval involved. As previously noted, in the absence of tooth error a significant gain in signal can be obtained by shrinking the measurement interval from 120 degrees, in the case of a six cylinder engine, to 20 degrees. The difficulty is, of course, that over the smaller measurement interval tooth error has a more significant effect.

At a given average speed, other cyclical effects that can be expected to affect the measurement process include measurement wheel runout, fuel injector variability cylinder to cylinder in the case of port fuel injection, or fuel distribution in the case of throttle body fueling systems, and mechanical component tolerances. The effects of these errors, and others of the same character, at any speed can be removed by the process to be described.

Figure 2:
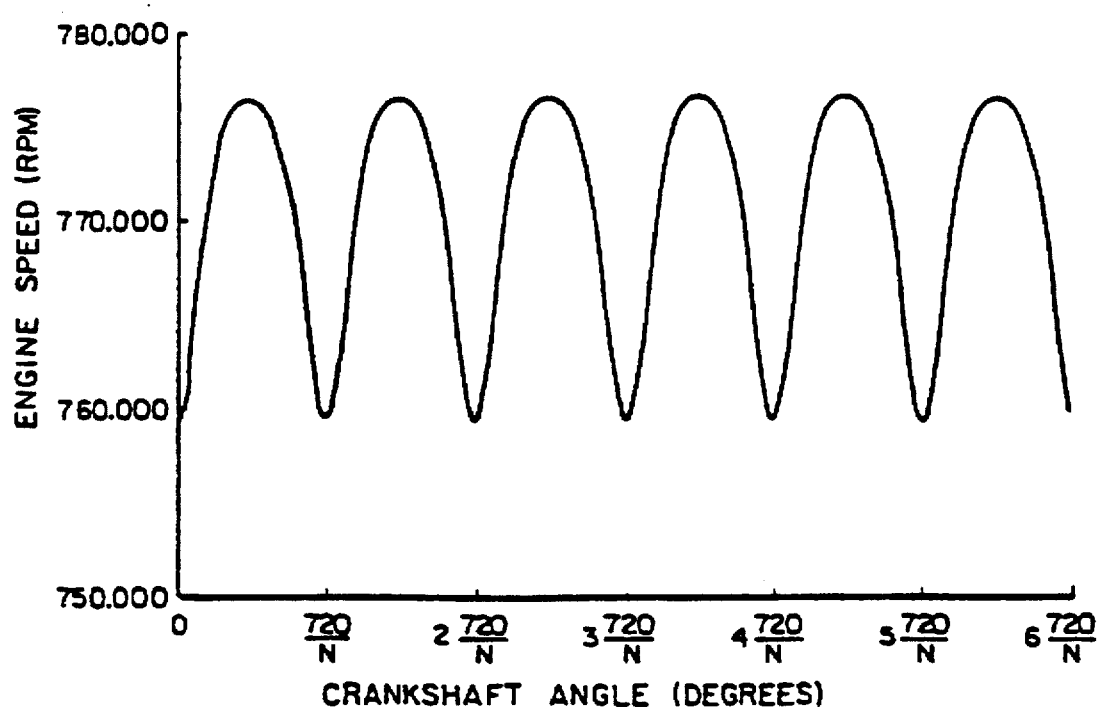
FIG. 2 illustrates engine speed in rpm versus crankshaft angle in degrees for an ideal, smoothly running N cylinder engine.

With knowledge that the engine is operating satisfactorily at some arbitrary reference speed, as at final checkout at the factory, or at a dealership, a mean or median value of the IP for each engine cylinder is determined after acceleration effects have been removed. In an ideal, smoothly running engine, the speed over each measurement interval will be the same, FIG. 2, and the IP values will be zero. Since it has been established that the engine is operating satisfactorily, these non-zero averaged IP values represent measurement errors arising from cyclic effects. Thus at the reference speed these IP values may be thought of as correction factors, since by subtracting them from each IP, IP values are obtained which are, on average, zero for the satisfactorily running engine. In the same way, when operating at the same reference speed on the road, these values may be subtracted from the calculated IP values. In this way, one obtains a corrected set of IP values with the cyclical effects removed.

For use at speeds other than the reference speed at which the correction factors to the IP were determined, in some cases speed adjusted correction factors can be determined analytically. Examples of this type include tooth error effects. Alternatively, it may be desirable to determine correction factors at a set of reference speeds to include such effects as fuel injector variability across speeds. These corrections to the IP can then be stored in a look-up table on a cylinder by cylinder basis, for example in 1000 rpm increments of engine operation, with correction factors at speeds between stored values determined by interpolation. Correction factors which are both speed and load dependent can also be found and stored, if desirable. The IP corrections can thus be modified as the engine condition changes.

Once excessive misfire or roughness has been detected in a cylinder or cylinders, an appropriate warning signal indicating the problem exists may be illuminated for the driver, fuel flow may be shut off to the particular misfiring cylinder and/or, particularly in the case of roughness, other engine control action may be initiated. Alternatively, or in addition, a display may be provided of each cylinder's roughness level for the driver's information.

Assume to start that the engine is operating at a steady state, i.e. there is no acceleration from firing cycle to firing cycle. In a normally operating engine, engine torque fluctuates. These torque fluctuations give rise to engine speed fluctuations which may be monitored and used to obtain a measure of the average net torque over a cylinder firing interval, the period between successive top dead centers. Employing a rigid system model, the equation of motion for the engine system is given by, $$\frac{\pi}{30} J\dot{S} = T_E - T_L \tag{1}$$

where $T_E$ is the engine torque, $T_L$ is the load torque, S is the engine speed in revolutions per minute, and J is the effective rotational inertia of the system. Integrating Equation (1) between successive top dead centers, the firing interval, yields, $$S_{TDC_{i+1}} - S_{TDC_i} = \frac{30}{\pi} \int_{t_{TDC_i}}^{t_{TDC_{i+1}}} (T_E - T_L) dt \tag{2}$$

Let a performance index for the i'th cylinder, $IP_i$, be defined as $$IP_i = S_{TDC_{i+1}} - S_{TDC_i} \tag{3}$$

From Equation (2), this is seen to be proportional to the integrated net torque produced by the engine over the firing interval of the i'th cylinder.

The time, $t_{F,i}$ is defined as the time over which the firing interval occurred, $$t_{F,i} = t_{TDC_{i+1}} - t_{TDC_i} \tag{4}$$

Then dividing $IP_i$ of Equation (3) by $t_{F,i}$, the speed normalized index of performance of the i'th cylinder is given by $$\tilde{IP}_i = \frac{S_{TDC_{i+1}} - S_{TDC_i}}{t_{F,i}} \propto \frac{1}{t_{F,i}} \int_{t_{TDC_i}}^{t_{TDC_{i+1}}} (T_E - T_L) dt \tag{5}$$

$\tilde{IP}_i$, the speed normalized misfire index of performance for the i'th cylinder, is directly proportional to the average net torque acting on the crankshaft during the firing interval of the i'th cylinder. The best measure of the average net torque is given by the speed measurement scheme that provides the best measure of speed at TDC.

Misfire in a firing cycle may then be said to occur when a cylinder IP or $\tilde{IP}$ during the cycle is more negative than a threshold value. The cylinder or cylinders whose IP or $\tilde{IP}$ values exceed the misfire threshold are identified as misfiring cylinders. One may use either IP or $\tilde{IP}$ to determine misfire. If IP is used rather than $\tilde{IP}$, the threshold value must be adjusted for speed. Even if $\tilde{IP}$ is used, it may be desirable to vary the misfire threshold with speed and load to obtain the largest spread between normal engine operation and the level that the misfire detection system interprets as misfire.

Thus far steady state engine operation has been assumed. To account for transient operation, i.e. acceleration between firing cycles, a particular acceleration compensation method is used. The method uses the difference between the speed at the start of the next data collection cycle and that at the start of the current cycle to calculate a speed correction for each of the speed measures in the data collection cycle. In this way even though there will be changes in speed measures within a cycle, no acceleration correction results if the start and end point of the data collection cycle have the same speed measure.

Figure 3:
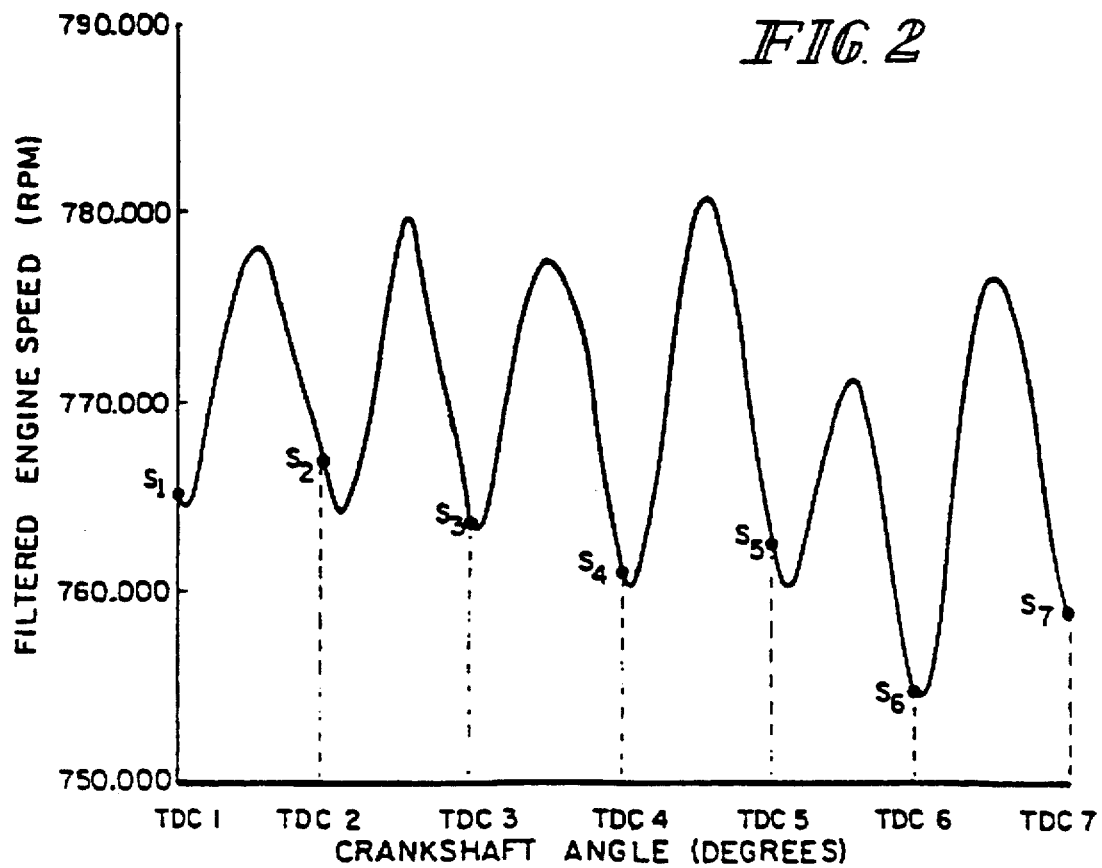
FIG. 3 illustrates engine speed in rpm versus crankshaft angle in degrees throughout a firing cycle or data collection cycle for a six cylinder engine.
Figure 4:
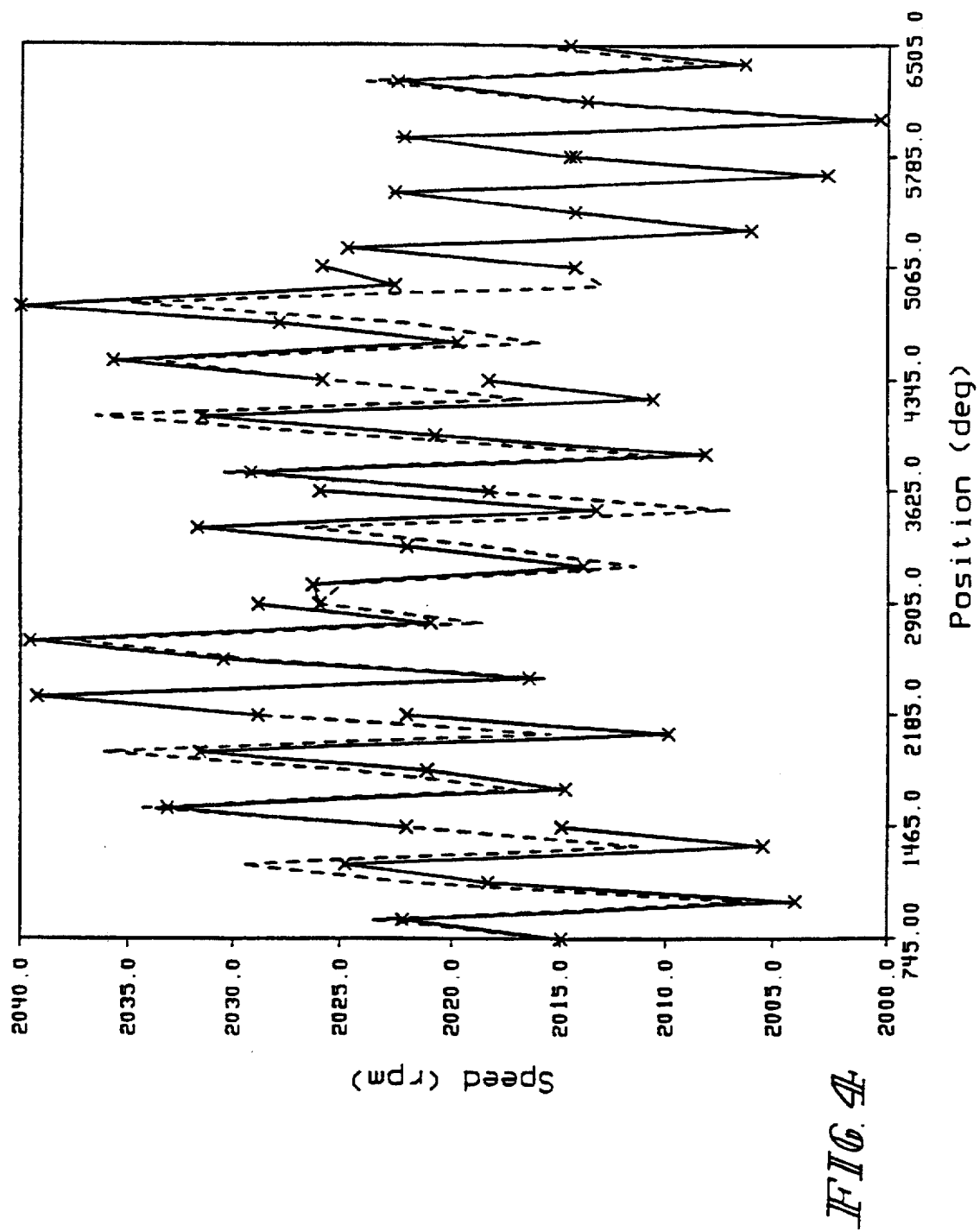
FIG. 4 illustrates data on crankshaft speed in broken lines and crankshaft speed corrected for acceleration in solid lines, both in rpm, versus crankshaft angle in degrees through approximately eight firing cycles for a six cylinder engine.
Figure 7:
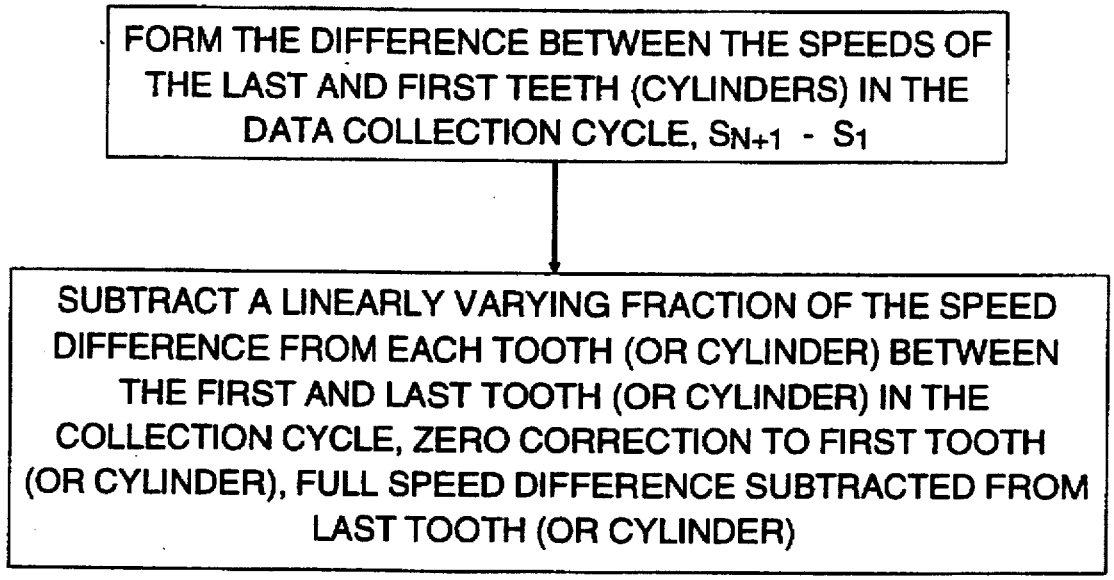

In a given data collection cycle, for an N cylinder engine, speed measures are taken at N+1 cylinders. FIG. 3 illustrates the data collection cycle for a 6 cylinder engine. In what follows, for illustration, it is assumed that the crankshaft speed measures are measures of the crankshaft speed at TDC at the start of the power stroke. The difference between the ending speed measure and the starting one is then formed (with reference to FIG. 7), $$\Delta S_{cyc} = S_{N+1} - S_1 \tag{6}$$

where $S_1$ is the speed measure at TDC of the first cylinder in the data collection cycle, nominally the first cylinder in the firing order, and $S_{N+1}$ is the speed measure at TDC of the first cylinder in the data collection cycle in the next firing cycle. The quantity $\Delta S_{cyc}$ is then used to calculate a speed correction at each TDC in the data collection cycle as follows.

$$S_{C,i} = S_i - [(i-1) \cdot \Delta S_{cyc}/N] \tag{7}$$

where i is the number of the cylinder in the data collection cycle and $1 \le i \le N+1$. The result of correcting speed measures in this manner is illustrated in FIG. 4. (A factor other than (i–1) might be used to recognize that the speed does not vary linearly with angle, but it has not been found necessary.) Under some circumstances it may be desirable to determine the acceleration correction over multiple firing cycles with appropriate adjustment to the attribution of the acceleration to the intervening cylinders.

After correcting the TDC speed measures for acceleration, an acceleration corrected index of performance, $IP_{C,i}$, or a speed normalized acceleration corrected index, $\tilde{IP}_{C,i}$ may be calculated for each cylinder, $1 \le i \le N$, $$IP_{C,i} = S_{C,i+1} - S_{C,i} \tag{8}$$

$$\tilde{IP}_{C,i} = \frac{S_{C,i+1} - S_{C,i}}{t_i} \tag{9}$$

With acceleration effects accounted for, the value of $IP_{C,i}$ or $\tilde{IP}_{C,i}$ should be zero in a smoothly running engine. That is, $S_{C,i+1}$ should equal $S_{C,i}$. However, tooth spacing error and other tolerance effects result in cyclic variations in the speed measures that cause $IP_{C,i}$ or $\tilde{IP}_{C,i}$ to be non-zero even in a smoothly running engine. Such effects have the potential to cause error in the misfire detection process. The recognition that such cyclic errors exist in the misfire indices in a smoothly running engine suggests the means to resolve the difficulty. The cyclic nature of the speed variations after acceleration effects are removed is illustrated in FIG. 4.

Figure 8:
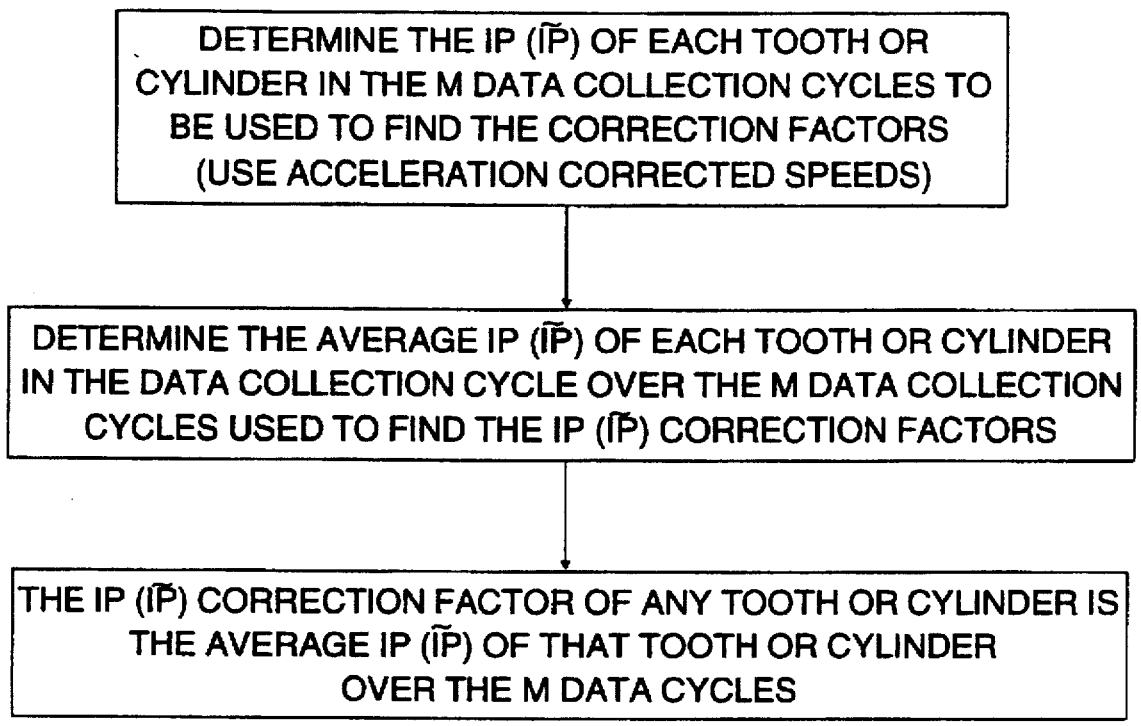

Referring to FIG. 8, with knowledge that the engine is operating satisfactorily, as at final checkout at the factory, or at a dealership, a mean or median value of the $IP_{C,i}$ or $\tilde{IP}_{C,i}$ for each engine cylinder can be determined after acceleration effects have been removed. These quantities are referred to hereinafter $\overline{IP}_{CF,i}$, or $\overline{\tilde{IP}}_{CF,i}$ in the speed normalized case. Since the engine was determined to be operating satisfactorily, the misfire index values should be zero. Therefore the values just obtained are subtracted from each index to remove the cyclic effects which are causing them to be non-zero during normal operation. In this manner the mean or median values determined are used as correction factors. On the road, when operating at the same speed as that for which the correction factors were obtained, the non-zero values obtained during satisfactory engine operation are subtracted from the calculated $IP_{C,i}$ or $\tilde{IP}_{C,i}$ values to obtain a corrected set of values with the cyclical effects removed.

Thus after correcting for acceleration, and then for cyclic effects, one obtains the value of performance index corrected for both acceleration and cyclic effects, $$IP_{CORR,i} = IP_{C,i} - \overline{IP}_{CF,i} \tag{10}$$

or, for the corrected speed normalized index, $$\tilde{IP}_{CORR,i} = \tilde{IP}_{C,i} - \overline{\tilde{IP}}_{CF,i} \tag{11}$$

As previously noted, at speeds other than the reference speed at which the correction factors $\overline{IP}_{CF,i}$ or $\overline{\tilde{IP}}_{CF,i}$ were determined, speed adjusted correction factors can be determined analytically in some cases. Examples of this type include correction for tooth error effects. In general, it may be desirable to determine correction factors at a set of reference speeds and loads to include such effects as injector variability across speeds and air/fuel ratio distribution as a function of both speed and load. These corrections would then be stored in a look-up table, or array, if load is included, on a cylinder by cylinder basis, for example in 1000 rpm increments of engine operation, with correction factors at speeds between stored values determined by interpolation. If correction factors that vary with load are used, then a two sided interpolation within the array or stored values can be employed. Load as used herein includes measures of load, e.g. mass air flow.

In the case of tooth error, if the cyclic correction factors $\overline{IP}_{CF,i}$ or $\overline{\tilde{IP}}_{CF,i}$ are determined at the reference speed $\overline{S}$, then at any other speed S, the speed adjusted tooth error correction factor will be given by $$\overline{IP(S)}_{CF,i} = \overline{IP}_{CF,i} \frac{S}{\overline{S}} \tag{12}$$

or $$\overline{\tilde{IP}(S)}_{CF,i} = \overline{\tilde{IP}}_{CF,i} \frac{S^2}{\overline{S}^2} \tag{13}$$

Thus the tooth error correction factor at one speed may be used at other speeds. The development of equations (12) and (13) appears below under the heading Adjusting Tooth Error Correction Factors For Speed Variation.

It is not possible, however, to eliminate in this manner effects which do not follow the same speed variation law as tooth error. Thus determining correction factors at a set of reference speeds, and perhaps loads, may be desirable to obtain the most accurate correction across the speed/load range of interest.

Whether misfire has occurred is determined by comparing each cylinder index of performance, or the speed-normalized index if used, after correction for acceleration and cyclic errors, to a threshold value. The threshold value is determined from normal engine operation which is known to be free of misfits. Each $IP_{CORR,i}$ or $\overline{IP}_{CORR,i}$ value in the firing cycle is compared to a threshold value, and if it exceeds the threshold, that cylinder is identified as a misfiring cylinder. The threshold can be based on the speed at which the engine is running, the load on the engine, and, if any cylinder(s) is(are) misfiring, the number of cylinders which are misfiring and where they are in the firing order.

Adjusting Tooth Error Correction Factors For Speed Variation

The following development determines the proper adjustment to the correction factors to compensate for speed variation assuming that the correction factors are to be used to correct for tooth spacing error.

Recall that the correction factors are determined after the acceleration effect over the data collection cycle has been removed. The index of performance associated with the i'th cylinder is then given by Equation 8, $$IP_{C,i} = S_{C,i+1} - S_{C,i} \quad (14)$$

Since compensation for any acceleration that occurred over the firing interval has already been done, the value of $IP_{C,i}$ should be zero in an ideal engine, (i.e. $S_{C,i+1}$ should equal $S_{C,i}$). However, in a real engine effects such as tooth error in the calculation of the speed measure will cause $IP_{C,i}$ values to be non-zero, and thus may cause errors in the misfire detection process. Hence the need to correct the index of performance.

As previously noted, the speed measure over any measurement interval is determined by counting the number of clock counts that occur during the interval. If it is assumed that all measurement intervals are equal, and given by $\Delta\theta_{REF}$, the speed $S_{C,i}$ is then given by $$S_{C,i} = \frac{\alpha}{CC_{C,i}} \quad (15)$$

where $\alpha$ is the conversion factor relating the number of clock counts, $CC_{C,i}$, that occur during the measurement interval $\Delta\theta_{REF}$ to the speed, $S_{C,i}$, in revolutions per minute. The quantity $\alpha$ is given by $$\alpha = \frac{f_{CLK} \cdot \Delta\theta_{REF}}{6} \quad (16)$$

where $f_{CLK}$ is the clock frequency in clock counts per second and $\Delta\theta_{REF}$ is the nominal tooth spacing. Thus Equation 14, in terms of measured clock counts, becomes, $$IP_{C,i} = \alpha \left[ \frac{1}{CC_{C,i+1}} - \frac{1}{CC_{C,i}} \right] \quad (17)$$

However, the measured clock count values $CC_{C,i}$ and $CC_{C,i+1}$ do not depend on the reference angle interval $\Delta\theta_{REF}$, but on the actual intervals $\Delta\theta_i$ and $\Delta\theta_{i+1}$. See FIG. 5. Assuming rotation at the constant speed $\overline{S}$, the clock counts in the measurement intervals i and i+1 will be $$CC_{C,i} = \frac{f_{CLK} \cdot \Delta\theta_i}{6 \cdot \overline{S}} \quad CC_{C,i+1} = \frac{f_{CLK} \cdot \Delta\theta_{i+1}}{6 \cdot \overline{S}} \quad (18)$$

Substituting these expressions for the clock count values into the formula for $IP_{C,i}$ of Equation 17 yields, $$IP(\overline{S})_{C,i} = \Delta\theta_{REF} \left[ \frac{1}{\Delta\theta_{i+1}} - \frac{1}{\Delta\theta_i} \right] \overline{S} \quad (19)$$

As stated previously, under the constant speed of rotation $\overline{S}$, the index $IP_{C,i}$ should equal zero. However, since the measurement angles are not equal, $IP_{C,i}$ will not be zero at constant speed. The value of $IP_{C,i}$ determined at the constant speed $\overline{S}$ can thus be used as a correction factor at that speed. Under the assumption that the correction factor to be used will be a mean or median value in practice, $$IP_{CF,i} = \text{MEAN OR MEDIAN OF } [IP_{C,i}] \quad (20)$$

the corrected IP of the i'th cylinder is given by, $$IP_{CORR,i} = IP_{C,i} - IP_{CF,i} \quad (21)$$

This correction factor is only applicable at the given speed, $\overline{S}$ for which it was determined. To adjust the correction for speed, operation at some other speed S is considered. In that case, by Equation 17 the correction factor at speed S is, $$IP(S)_{C,i} = \Delta\theta_{REF} \left[ \frac{1}{\Delta\theta_{i+1}} - \frac{1}{\Delta\theta_i} \right] S \quad (22)$$

Comparing $IP(S)_{C,i}$ from Equation 22 with $IP(\overline{S})_{C,i}$ from Equation 19, it is seen that $$IP(S)_{C,i} = IP(\overline{S})_{C,i} \cdot \frac{S}{\overline{S}} \quad (23)$$

Therefore the IP correction factor at speed S can be obtained from that at speed $\overline{S}$ by multiplying the correction factor at $\overline{S}$ by the ratio $S/\overline{S}$.

The comparable adjustment for speed for the speed normalized index $\widetilde{IP}$ follows from recognition that $\widetilde{IP}$ is simply $IP/t_f$, and that $t_f$ varies inversely with speed. Thus $$\widetilde{IP}(S)_{C,i} = \widetilde{IP}(\overline{S})_{C,i} \cdot \frac{S^2}{\overline{S}^2} \quad (24)$$

The $\widetilde{IP}$ correction factor at speed S can be obtained from that at speed $\overline{S}$ by multiplying the correction factor at $\overline{S}$ by the ratio $S^2/\overline{S}^2$.

The process just given can be summarized in outline form as follows:

1. Collect speed data for each cylinder in the data collection cycle.
2. Correct the speed data for each cylinder in the data collection cycle for acceleration.
3. Form the individual cylinder IP's, or the speed normalized values $\widetilde{IP}$, using the acceleration corrected speed.
4. Correct the individual cylinder IP's, or $\widetilde{IP}$'s, for cyclic errors using the stored correction factors for each cylinder adjusted for speed and load as required.
5. Determine misfiring cylinders by comparing cylinder performance indices to threshold levels.
6. Continue by repeating the process over the set of cylinders in the next data collection cycle. The starting cylinder in the next data collection cycle is the ending cylinder in the current data collection cycle.

7. In this embodiment the data collection cycle advances N cylinders to test the next group of N cylinders for misfits.

The various steps of the speed correction and cyclic error correction processes can be performed in different orders with equally good results. The steps can be performed on a cylinder by cylinder basis or on a tooth by tooth basis, yielding highly accurate results. Some other examples of different orders of the process steps, both on a cylinder by cylinder basis and on a tooth by tooth basis, are illustrated here in outline form.

Figure 9:
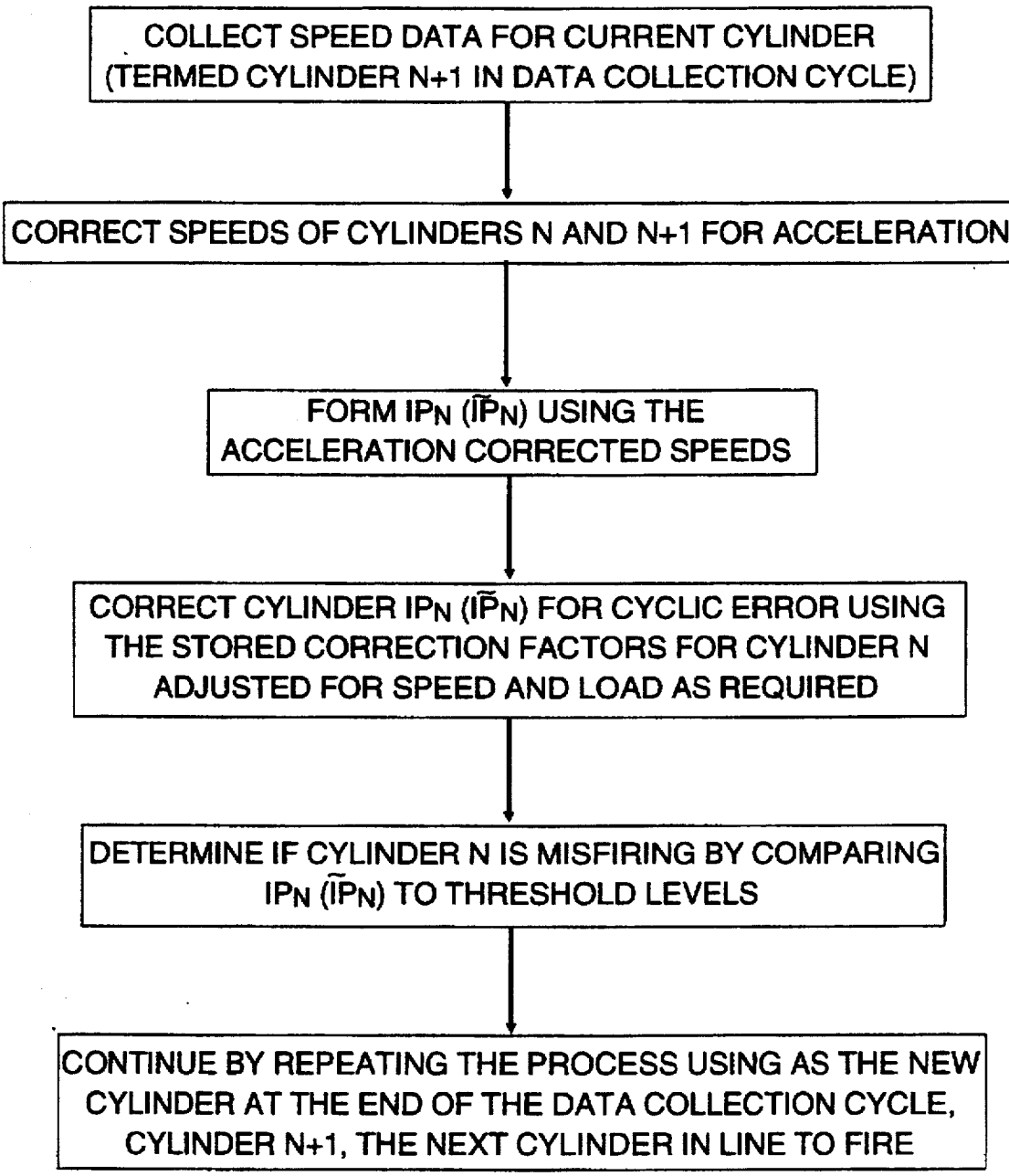

Sequential Determination of Misfits for Each Cylinder in Turn—Cyclical Error Correction After Determination of IP—FIG. 9

1. Consider the current cylinder to be cylinder k+1 in the firing order. Collect speed data for the current cylinder, i.e., the speed data about TDC for the cylinder currently in its power stroke. This cylinder speed data is used as the end of a data collection cycle, i.e., nominally the cylinder N+1 data value. The start of the data cycle is then taken to have occurred N cylinders back from the current cylinder. It is assumed that speed data previously has been collected for cylinders firing before the current cylinder.
2. Correct the speed data for the current cylinder (cylinder N+1) and the cylinder firing just prior to the current cylinder (cylinder N) for acceleration as done in the first embodiment, using the speeds associated with the first and last cylinders in the data collection cycle.
3. Form the IP, or the speed normalized $\tilde{\text{ip}}$, for the N'th cylinder using the acceleration corrected speeds, $S_{C,N}$ and $S_{C,N+1}$.
4. Correct the N'th cylinder IP, or $\tilde{\text{ip}}$, for cyclic error using the stored correction factor for this cylinder, adjusted for speed and load as required. The N'th cylinder is, of course, a unique cylinder in the firing order and has a particular correction factor. Under the convention established in Step 1 of this outline, the N'th cylinder is referred to as the k'th cylinder in the firing order.
5. Determine if the N'th cylinder is misfiring by comparing its cylinder performance index to the threshold level.
6. Continue by repeating the process using the new data collection cycle ending speed data, nominally the speed data from cylinder N+1 in the data collection cycle, the data from the next cylinder to fire. With reference to Step 1 of this outline, this would be cylinder (k+2) in the firing order.
7. In this embodiment, the data collection cycle advances one cylinder to test the next cylinder for misfire.

Figure 10:
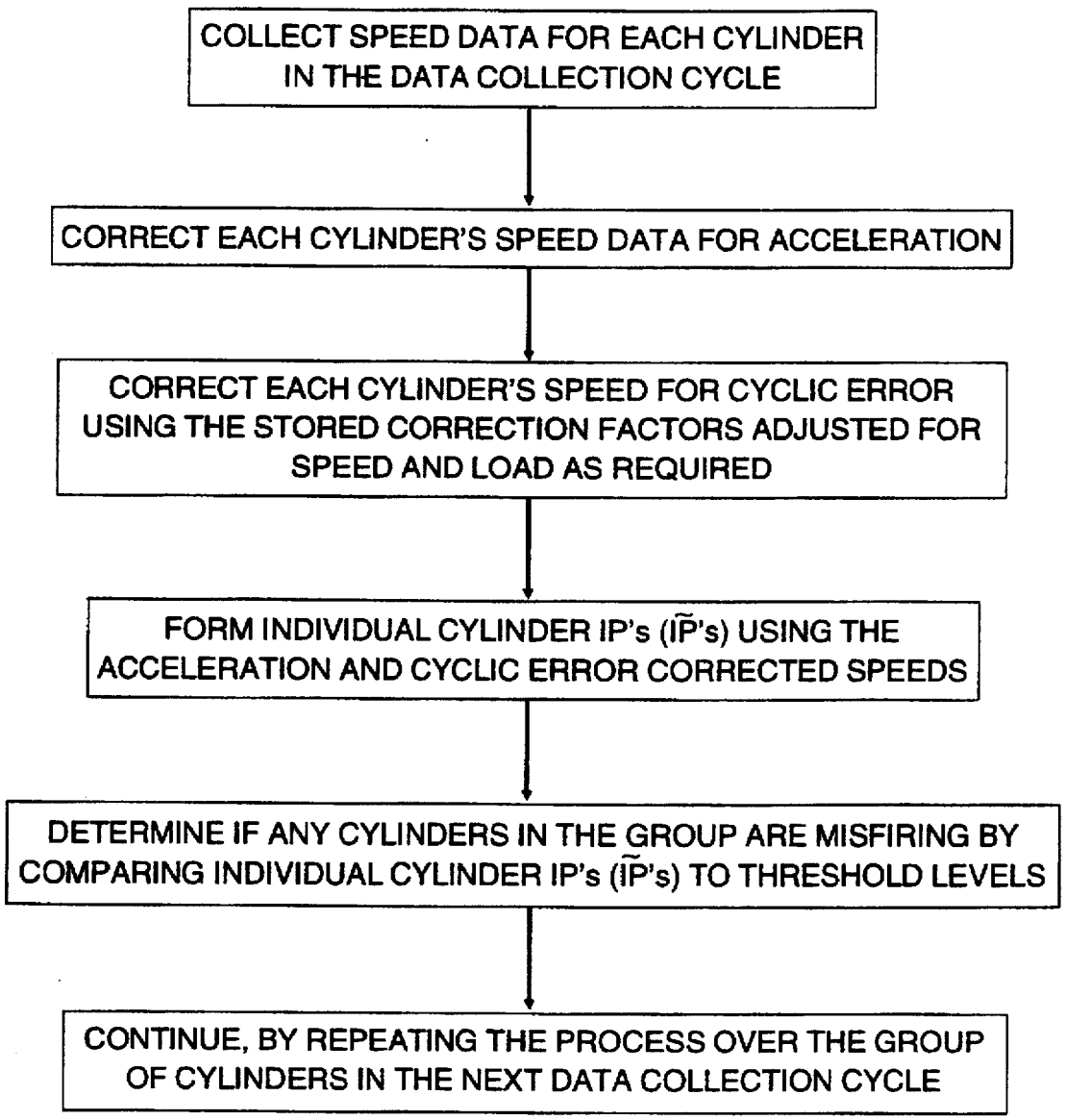

Determination of Misfire for All Cylinders in the Data Cycle As a Group—Cyclical Error Correction of Cylinder Speeds After Correcting Speeds for Acceleration—FIG. 10

1. Collect speed data for each cylinder in the data collection cycle.
2. Correct the speed data for each cylinder in the data collection cycle for acceleration as done in the first embodiment.
3. Correct the individual cylinder speeds for cyclic errors using the stored correction factors for each cylinder adjusted for speed and load as required.
4. Form the individual cylinder IP's, or the speed normalized $\tilde{\text{ip}}$'s, using the cylinder speeds as corrected for both acceleration and cyclic error.
5. Determine misfiring cylinders by comparing cylinder performance indices to threshold levels.
6. Continue by repeating the process over the set of cylinders in the next data collection cycle. The starting cylinder in the next data collection cycle is the ending cylinder in the current data collection cycle.
7. In this embodiment, the data collection cycle advances N cylinders to test the next group of N cylinders for misfire.

Figure 11:
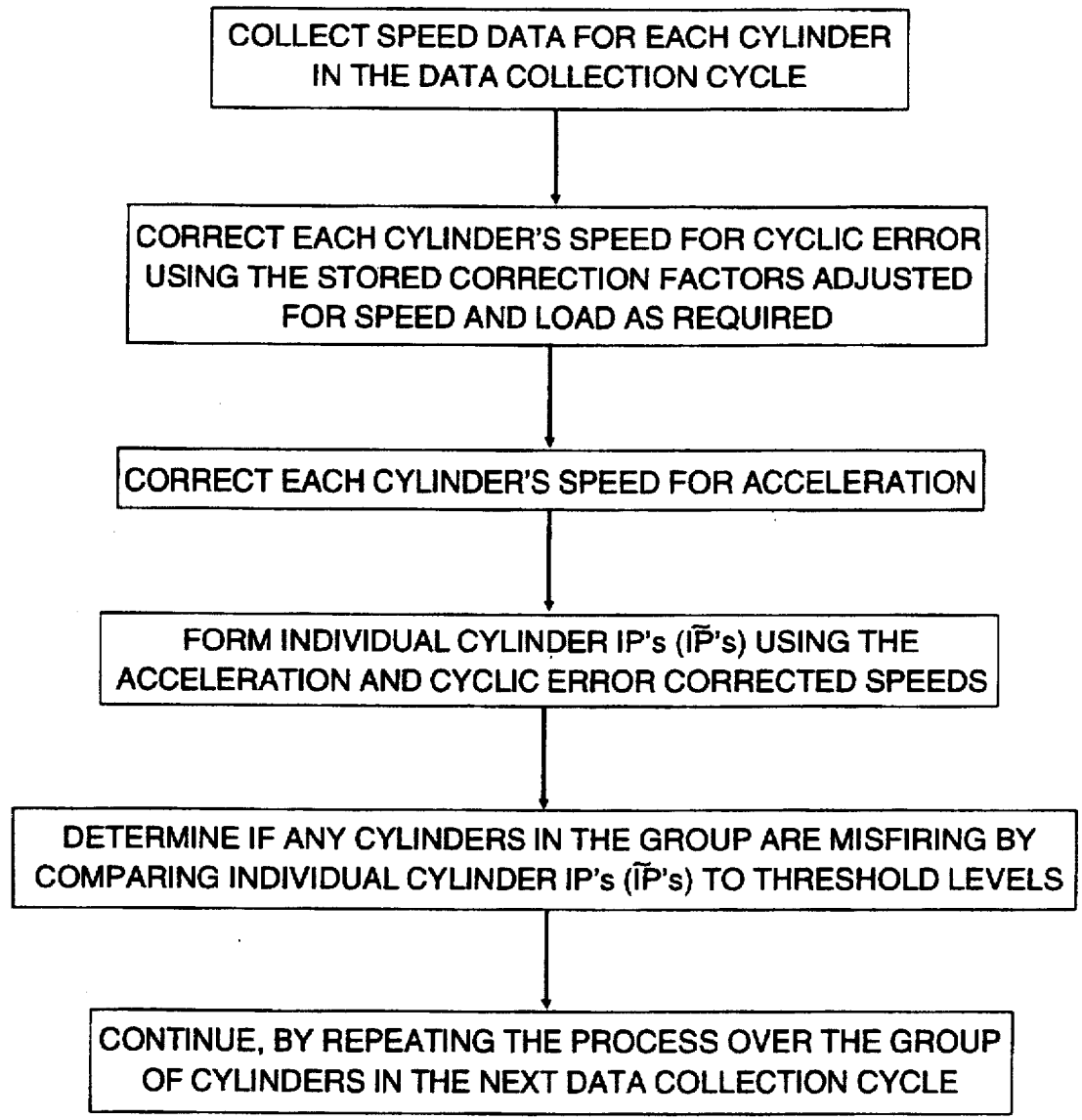

Determination of Misfire for All Cylinders in the Data Cycle As a Group—Cyclical Error Correction of Cylinder Speeds Before Correcting Speeds for Acceleration—FIG. 11

1. Collect speed data for each cylinder in the data collection cycle.
2. Correct the individual cylinder speeds for cyclic errors using the stored correction factors for each cylinder adjusted for speed and load as required.
3. Correct the speed data for each cylinder in the data collection cycle for the acceleration as done in the first embodiment.
4. Form the individual cylinder IP's, or the speed normalized $\tilde{\text{ip}}$'s, using the cylinder speeds as corrected for both acceleration and cyclic error.
5. Determine misfiring cylinders by comparing cylinder performance indices to threshold levels.
6. Continue by repeating the process over the set of cylinders in the next data collection cycle. The starting cylinder in the next data collection cycle is the ending cylinder in the current data collection cycle.
7. In this embodiment, the data collection cycle advances N cylinders to test the next group of N cylinders for misfire.

Figure 12:
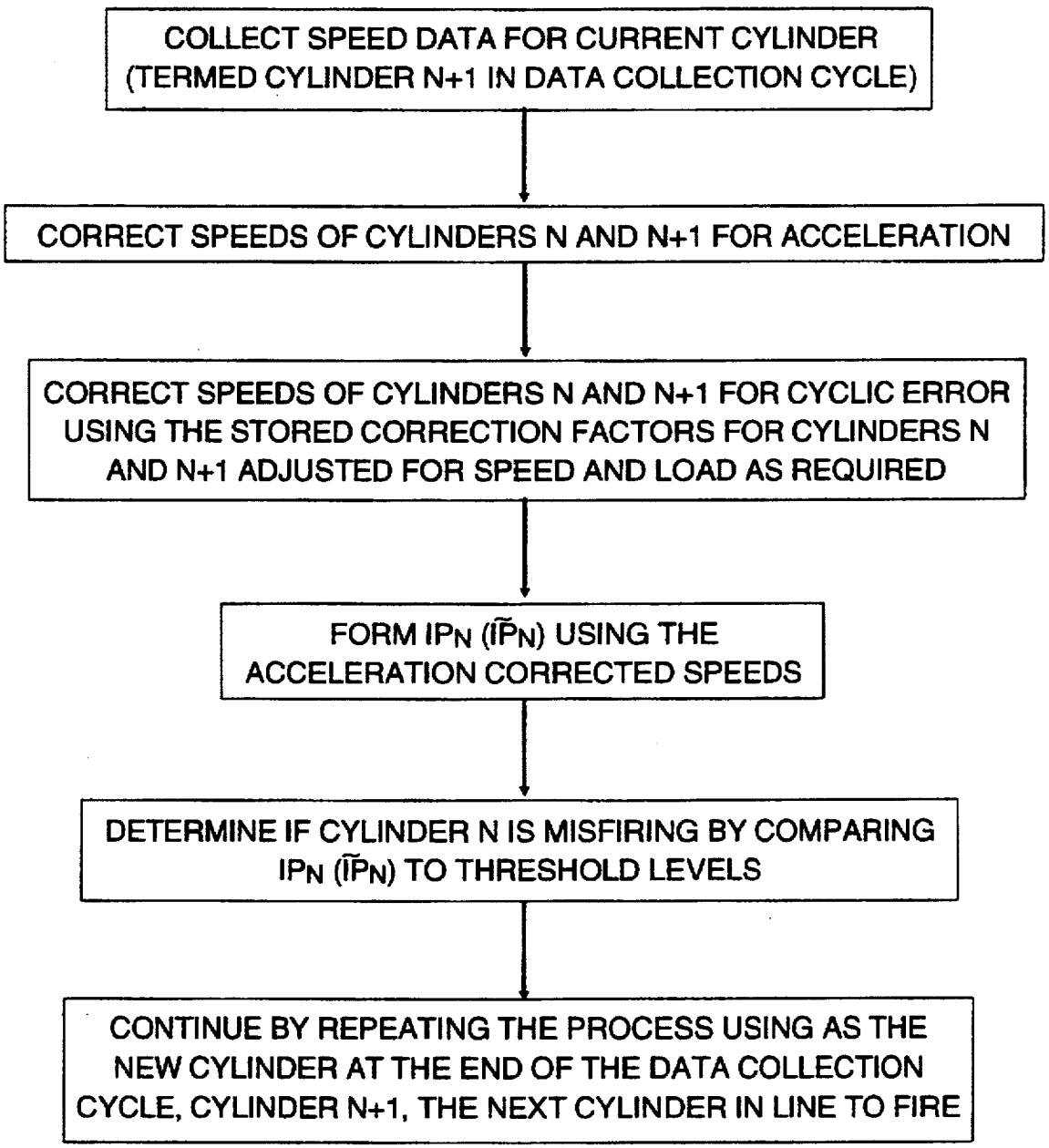

Sequential Determination of Misfire for Each Cylinder in Turn—Cyclical Error Correction of Cylinder Speeds After Correcting Speeds for Acceleration—FIG. 12

1. Consider the current cylinder to be cylinder k+1 in the firing order. Collect speed data for the current cylinder, i.e., the speed data about TDC for the cylinder currently in its power stroke. This cylinder speed data is used as the end of a data collection cycle, i.e., nominally the cylinder N+1 data value. The start of the data cycle is then taken to be N cylinders back from the current cylinder. Again, as this sequential process is described, it is assumed that speed data previously has been collected for cylinders firing before the current cylinder.
2. Correct the speed data for the current cylinder (cylinder N+1) and the cylinder firing just prior to the current cylinder (cylinder N) for acceleration as done in the first embodiment, using the speeds associated with the first and last cylinders in the data collection cycle.
3. Correct the speeds of cylinders N and N+1 for cyclic error using the stored correction factors for each cylinder, adjusted for speed and load as required. The cylinders labeled N and N+1 in the data collection cycle are, of course, unique cylinders in the firing order, and each has a particular cyclic error correction factor. They are referred to in Step 1 of this outline as cylinders k and k+1 in the firing order.

4. Form the IP, or the speed normalized $\bar{\text{P}}$, for the N'th cylinder using speeds for cylinders N and N+1 as now corrected for both acceleration and cyclic error.
5. Determine if the N'th cylinder is misfiring by comparing its cylinder performance index to the threshold level.
6. Continue by repeating the process using as the new data collection cycle ending speed data, nominally the data from cylinder N+1 in the data collection cycle, the data from the next cylinder to fire. With reference to Step 1 of this outline, this would be cylinder (k+2) in the firing order.
7. In this embodiment, the data collection cycle advances one cylinder to test the next cylinder for misfits.

Figure 13:
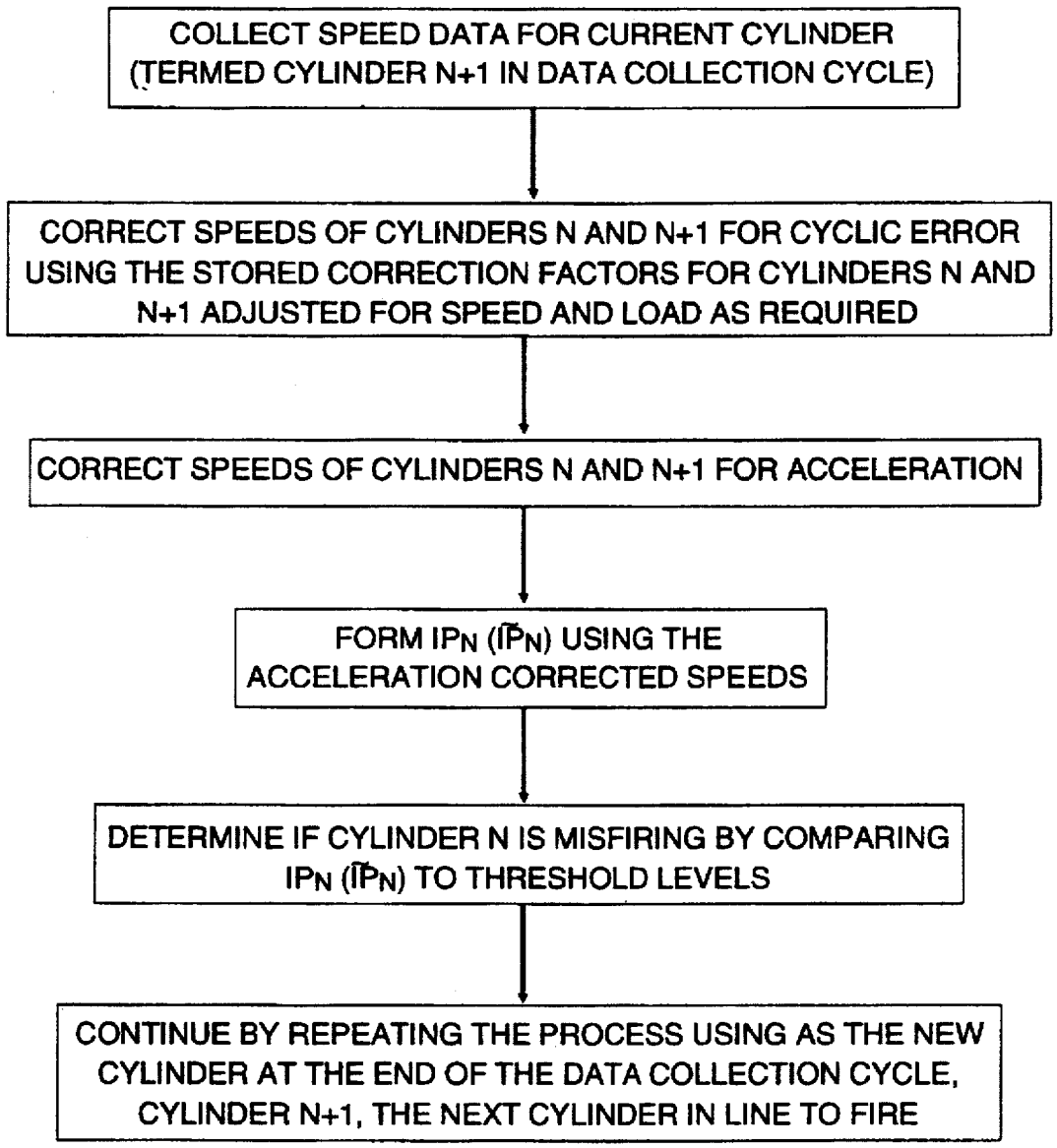

Sequential Determination of Misfits for Each Cylinder in Turn—Cyclical Error Correction of Cylinder Speeds Before Correcting Speeds for Acceleration—FIG. 13

1. Consider the current cylinder to be cylinder k+1 in the firing order. Collect speed data for the current cylinder, i.e., the speed data about TDC for the cylinder currently in its power stroke. This cylinder speed data is used as the end of a data collection cycle, i.e., nominally the cylinder N+1 data value. The start of the data cycle is then taken to be N cylinders back from the current cylinder. Again, as this sequential process is described, it is assumed that speed data previously has been collected for cylinders firing before the current cylinder.
2. Correct the speeds of cylinders N and N+1 for cyclic error using the stored correction factors for each cylinder, adjusted for speed and load as required. The cylinders labeled N and N+1 in the data collection cycle are, of course, unique cylinders in the firing order, and each has a particular cyclic error correction factor. They are referred to in Step 1 of this outline as cylinders k and k+1 in the firing order.
3. Correct the speed data for the current cylinder (cylinder N+1) and the cylinder firing just prior to the current cylinder (cylinder N) for acceleration as done in the first embodiment, using the speeds associated with the first and last cylinders in the data collection cycle.
4. Form the IP, or the speed normalized $\bar{\text{P}}$, for the N'th cylinder using speeds for cylinders N and N+1 as now corrected for both acceleration and cyclic error.
5. Determine if the N'th cylinder is misfiring by comparing its cylinder performance index to the threshold level.
6. Continue by repeating the process using as the new data collection cycle ending speed data, nominally the data from cylinder N+1 in the data collection cycle, the data from the next cylinder to fire. With reference to Step 1 of this outline, this would be cylinder (k+2) in the firing order.
7. In this embodiment, the data collection cycle advances one cylinder to test the next cylinder for misfits.

The various steps of the speed correction and cyclic error correction processes can also be performed on a tooth by tooth basis, rather than on a cylinder by cylinder (a group of teeth associated with a cylinder by group of teeth associated with a cylinder) basis. The following very brief outline establishes a technique for such correction.

Figure 14:
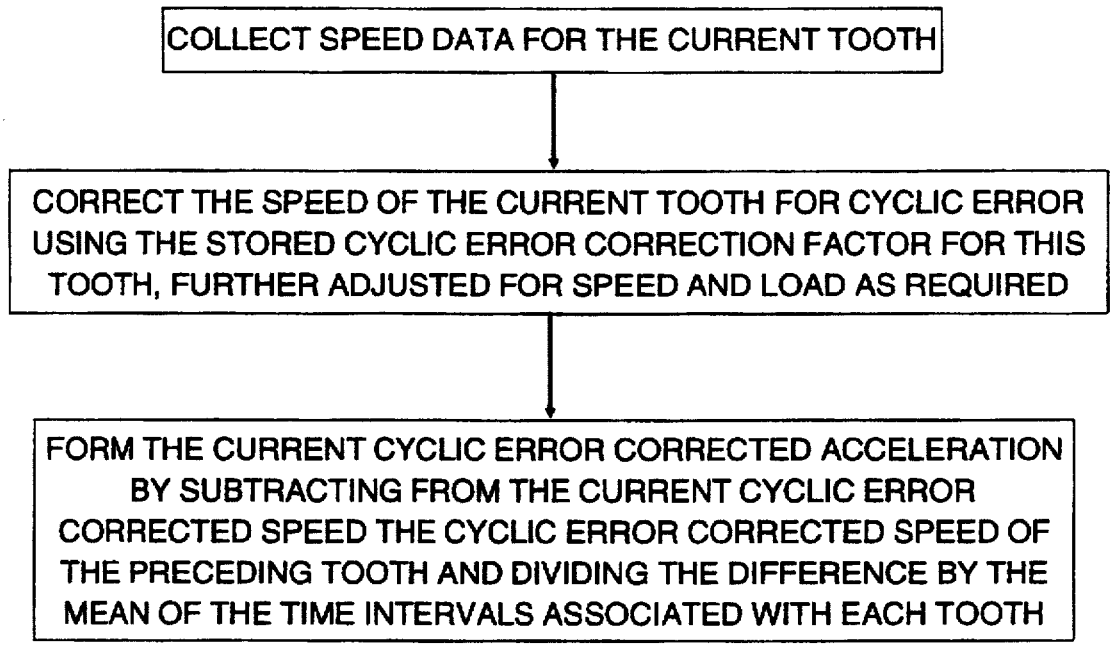

Sequential Determination of Corrected Speeds On a Tooth By Tooth Basis—Corrected Acceleration On a Tooth by Tooth Basis—FIG. 14

1. Collect speed data for the current tooth.
2. Correct the speed of the current tooth for cyclic error using the stored cyclic error correction factor for this tooth, further adjusted for speed and load as required.
3. Form the current cyclic error corrected acceleration by subtracting from the current cyclic error corrected speed the cyclic error corrected speed of the preceding tooth and dividing the difference by the mean of the time intervals associated with each tooth.

Figure 15:
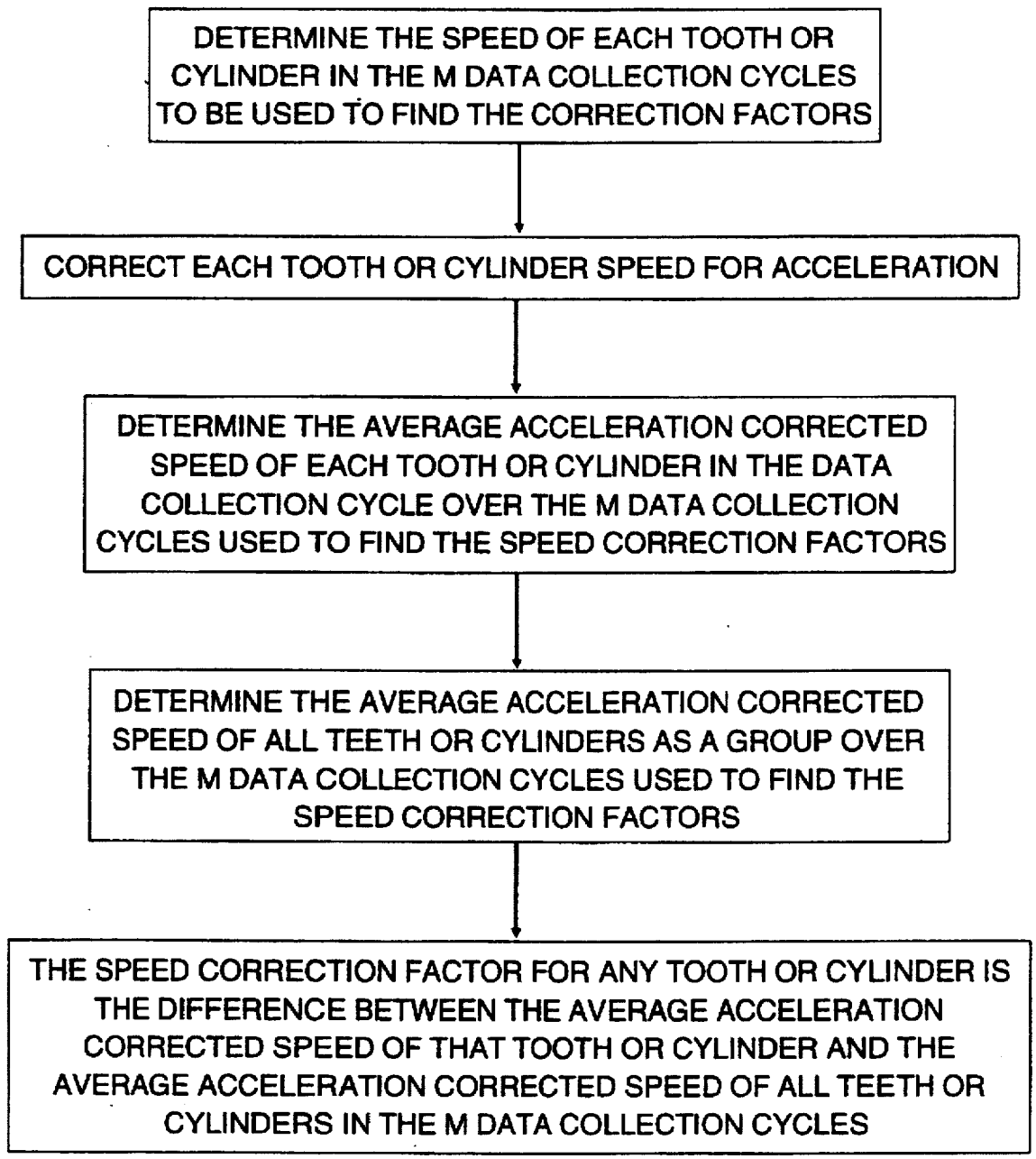

Determination of Tooth or Cylinder Speed Correction Factors—FIG. 15

1. Determine the speed measure for each cylinder (or tooth) in the data collection cycle to be used.
2. Correct the speed for acceleration as described in Equation 7 for cylinder speed measures. For speed measures on a tooth by tooth basis, the process is the same except that each tooth speed measure is corrected for acceleration, rather than the speed measure over a group of teeth associated with a cylinder.
3. Determine the average acceleration-corrected speed over the number of data cycles used to find the speed correction factors.
4. During normal operation, with the speed corrected for acceleration, the speed should be constant. To the extent the speed is not constant, the deviation can be interpreted as resulting from a cyclic error. The speed correction factors are defined as the difference between the acceleration-corrected speed of the cylinder (or tooth) and the mean speed. Random errors are not corrected by this process.

It should be clear that the toothed wheel, clock counts from the passage of teeth of which form the speed, acceleration and/or performance data generated in the methods of the present invention, need not be mounted on the vehicle engine itself. For example, the toothed wheel can be mounted on the vehicle transmission. Under appropriate circumstances, the toothed wheel can be a transmission gear. Further it should be clear that the toothed wheel can monitor other types of performance than combustion events in the cylinders of a vehicle internal combustion engine. For example, in a vehicle equipped with an anti-lock braking system (ABS), locking up of the vehicle's ground wheels during braking is to be avoided. The methods of the present invention are applicable to such systems. A toothed wheel or other measurement device coupled to each ground wheel for rotation by the ground wheel is monitored for rotation rate. Substantial increases in the number of clock counts per unit of ground wheel rotation, premonitory to locking up of the ground wheel, can be fed back to, and corrective (for example, brake releasing) action taken by, other components of the ABS to prevent locking up of the ground wheel. It should also be clear that the speed, acceleration and cyclical error correction methods presented can be applied equally to rotating components in non-vehicle environments.

Implementation of the Correction Process When Cylinder Pressure Sensing Is Used For Misfire Detection In this case let it be assumed that there is a cylinder pressure measure, $P_i$, associated with each cylinder rather than a speed measure.

To account for transient operation, i.e. acceleration between firing cycles, a particular method of acceleration compensation is used. The word acceleration now refers to the change in the pressure measure between data collection cycles, rather than the change in speed which was employed in the crankshaft speed measurement embodiments discussed previously. The cylinder pressure method uses the difference between the pressure measure at the start of the next data collection cycle and that at the start of the current cycle to calculate a pressure correction for each of the pressure measures in the data collection cycle. In this way even though there will be changes in pressure measures within a cycle, no acceleration correction results if the start and end point of the data collection cycle have the same pressure measure.

In a given data collection cycle, for an N cylinder engine, pressure measures are taken at N+1 cylinders. Let it be assumed that the difference between the ending pressure measure and the starting one is then formed, $$\Delta P_{cyc} = P_{N+1} - P_1 \qquad (25)$$

where $P_1$ is the pressure measure of the first cylinder in the data collection cycle, nominally the first cylinder in the firing order, and $P_{N+1}$ is the pressure measure of the first cylinder in the data collection cycle in the next firing cycle. The quantity $\Delta P_{cyc}$ is then used to calculate a pressure correction at each pressure measure in the data collection cycle as follows.

$$P_{c,i} = P_i - [(i-1) \cdot \Delta P_{cyc}/N] \qquad (26)$$

where i is the number of the cylinder in the data collection cycle, $1 \le i \le N+1$.

After correcting the pressure measures for change, i.e., acceleration, an acceleration corrected index of performance, $IP_{C,i}$, may be calculated for each cylinder, $1 \le i \le N$, $$IP_{C,i} = P_{c,i} - \bar{P}_c \qquad (27)$$

where $$\bar{P}_c = \frac{\sum_{i=1}^{N} P_{c,i}}{N} \qquad (28)$$

Equation 27 is of a slightly different form than Equation 8 in recognition that, in the case of pressure, two misfiring cylinders in a row would have equally low pressure measures. Thus, the difference between them would be zero, rather than indicating a negative misfire index for the i'th cylinder. By using $\bar{P}_c$ in $IP_{C,i}$, this difficulty is avoided.

With acceleration accounted for, the value of $IP_{C,i}$ should be zero in a smoothly running engine (i.e. $P_{C,i}$ should equal $\bar{P}_C$). However, fuelling and tolerance effects, for example, result in cyclic variations in the pressure measures that cause $IP_{C,i}$ to be non-zero even in a smoothly running engine. Thus such effects have the potential to cause error in the misfire detection process.

With knowledge that the engine is operating satisfactorily, as at final checkout at the factory, or at a dealership, a mean or median value of the $IP_{C,i}$ for each engine cylinder can be determined after acceleration effects have been removed. These quantities are referred to herein as $\overline{IP}_{CF,i}$. Since the engine was determined to be operating smoothly, the misfire index values should be zero. Therefore, the values just obtained are subtracted from each index to remove the cyclic effects which are causing them to be non-zero during normal operation. In this manner the mean or median values determined are used as correction factors. On the road, when operating at the same speed and/or load as that for which the correction factors were obtained, the non-zero values may be subtracted from the $IP_{C,i}$ a values calculated to obtain a corrected set of values with the cyclical effects removed.

Thus after correcting for acceleration, and then for cyclic effects, we obtain the corrected value of performance index corrected for both acceleration and cyclic effects, $IP_{CORR,i}$, where $$IP_{CORR,i} = IP_{C,i} - \overline{IP}_{CF,i} \qquad (29)$$

In general, it may be desirable to determine correction factors at a set of reference speeds and loads. These corrections would then be stored in a look-up table, or array if load is included, on a cylinder by cylinder basis, with interpolation used to obtain the desired values from the table or array.

Comparable to the normalization with respect to speed obtained in forming $\overline{IP}_i$ by dividing $IP_i$ by $t_{f,i}$ (see Equations 8 and 9), a normalized $\overline{IP}_i$ may be formed in this embodiment by normalization with respect to load. Thus $$\overline{IP}_i = \frac{IP_i}{\bar{P}_c} \qquad (30)$$

Determination of the normalized correction factors and $\overline{IP}_{CORR,i}$ then proceeds as before.

Whether misfire has occurred is determined by comparing each cylinder index of performance after correction for acceleration and cyclic errors to a threshold value. The threshold value is determined from normal engine operation which is known to be free of misfire. Each $IP_{CORR,i}$ or $\overline{IP}_{CORR,i}$ value in the firing cycle is compared to the threshold value, and if it exceeds the threshold that cylinder is identified as a misfiring cylinder.

TABLE 1

| IDLE (NEUTRAL) SUMMARY | |
|---|---|
| NO MISFIRE | |
| Engine Speed (RPM) | Largest ΔLU [Cylinder]*, (Cycle) |
| 660 | 63.25 [3] (34) |
| 1060 | 94.11 [3] (12) |
| 2020 | 105.43 [3] (11) |

| SINGLE MISFIRE CYLINDER #1 | | |
|---|---|---|
| Engine Speed (RPM) | Largest ΔLU [Cylinder]*, (Cycle) | Second Largest ΔLU [Cylinder]*, (Cycle) |
| 650 | 54.80 [1] (5) | 46.00 [1] (8) |
| 1120 | 91.26 [5] (11) | 63.17 [2] (7) |
| 1990 | 147.71 [2] (4) | 109.94 [3] (19) |

| CONTINUOUS MISFIRE CYLINDER #1 | |
|---|---|
| Engine Speed (RPM) | Smallest ΔALU [Cylinder]*, (Cycle) |
| 650 | 59.71 [2] (29) |
| 990 | 99.60 [3] (19) |
| 2030 | 72.34 [1] (19) |

*Cylinder with largest time period in cycle.

TABLE 2

SIMULATION RESULTS
CYLINDER #1 MISFIRING
(Cylinders Numbered by Position in Firing Order)

CYLINDER #1

| IP.TDC | IP.M10-P10 | IP.M60-P60 | IP.M70-P50 | IP.M50-P70 |
|---|---|---|---|---|
| −63.1 | −62.2 | −46.2 | −47.4 | −43.9 |

CYLINDER #2

| IP.TDC | IP.M10-P10 | IP.M60-P60 | IP.M70-P50 | IP.M50-P70 |
|---|---|---|---|---|
| 8.3 | 8.2 | 5.4 | 2.9 | 7.3 |

CYLINDER #3

| IP.TDC | IP.M10-P10 | IP.M60-P60 | IP.M70-P50 | IP.M50-P70 |
|---|---|---|---|---|
| 13.1 | 13.3 | 12.9 | 12.9 | 12.8 |

CYLINDER #4

| IP.TDC | IP.M10-P10 | IP.M60-P60 | IP.M70-P50 | IP.M50-P70 |
|---|---|---|---|---|
| 13.0 | 12.9 | 12.6 | 12.6 | 12.7 |

CYLINDER #5

| IP.TDC | IP.M10-P10 | IP.M60-P60 | IP.M70-P50 | IP.M50-P70 |
|---|---|---|---|---|
| 12.8 | 12.8 | 12.7 | 12.7 | 12.6 |

CYLINDER #6

| IP.TDC | IP.M10-P10 | IP.M60-P60 | IP.M70-P50 | IP.M50-P70 |
|---|---|---|---|---|
| 16.0 | 15.1 | 2.6 | 6.3 | −1.5 |

CYLINDER #1

| IP.TDC | IP.M10-P10 | IP.M60-P60 | IP.M70-P50 | IP.M50-P70 |
|---|---|---|---|---|
| −63.1 | −62.2 | −46.2 | −47.3 | −43.9 |

CYLINDER #2

| IP.TDC | IP.M10-P10 | IP.M60-P60 | IP.M70-P50 | IP.M50-P70 |
|---|---|---|---|---|
| 8.3 | 8.2 | 5.4 | 2.9 | 7.3 |

CYLINDER #3

| IP.TDC | IP.M10-P10 | IP.M60-P60 | IP.M70-P50 | IP.M50-P70 |
|---|---|---|---|---|
| 13.1 | 13.3 | 12.9 | 12.9 | 12.8 |

CYLINDER #4

| IP.TDC | IP.M10-P10 | IP.M60-P60 | IP.M70-P50 | IP.M50-P70 |
|---|---|---|---|---|
| 13.0 | 12.8 | 12.6 | 12.6 | 12.7 |

CYLINDER #5

| IP.TDC | IP.M10-P10 | IP.M60-P60 | IP.M70-P50 | IP.M50-P70 |
|---|---|---|---|---|
| 12.8 | 12.8 | 12.7 | 12.7 | 12.6 |

TABLE 3

COMMENTS: NO MISFIRE - 2000 rpm idle in neutral
PROCESSING INCLUDES ACCELERATION BUT NO TOOTH ERROR CORRECTION
MEASUREMENT ANGLE −70 TO 50 DEGREES ABOUT TDC

| CYCLE | ENGINE SPEED (RPM) | ACCEL (RPM/SEC) | MOST NEG. $\tilde{IP}$ [Cylinder] | SECOND MOST NEG. $\tilde{IP}$ [Cylinder] |
|---|---|---|---|---|
| 1 | 2075. | 88. | −17.68 [6] | −7.58 [3] |
| 2 | 2079. | 56. | −15.52 [3] | −13.72 [6] |
| 3 | 2081. | 14. | −13.21 [3] | −10.38 [4] |
| 4 | 2079. | −96. | −17.85 [3] | −17.62 [3] |
| 5 | 2074. | −87. | −29.39 [3] | −15.45 [6] |
| 6 | 2073. | 75. | −17.29 [3] | −3.58 [4] |
| 7 | 2078. | 84. | −13.29 [3] | −11.49 [6] |
| 8 | 2083. | 85. | −15.04 [6] | −12.28 [3] |
| 9 | 2079. | −217. | −17.67 [3] | −8.03 [6] |
| 10 | 2068. | −164. | −43.09 [3] | −6.91 [6] |
| 11 | 2060. | −121. | −21.22 [6] | −12.14 [1] |
| 12 | 2055. | −26. | −42.78 [3] | −10.32 [6] |
| 13 | 2058. | 127. | −12.34 [1] | −9.83 [6] |
| 14 | 2059. | −103. | −9.90 [6] | −8.03 [3] |
| 15 | 2059. | 106. | −21.25 [3] | −11.83 [3] |
| 16 | 2063. | 40. | −24.71 [3] | −9.90 [4] |

TABLE 3-continued

COMMENTS: NO MISFIRE - 2000 rpm idle in neutral
PROCESSING INCLUDES ACCELERATION BUT NO TOOTH ERROR CORRECTION
MEASUREMENT ANGLE −70 TO 50 DEGREES ABOUT TDC

| CYCLE | ENGINE SPEED (RPM) | ACCEL (RPM/SEC) | MOST NEG. $\tilde{IP}$ [Cylinder] | SECOND MOST NEG. $\tilde{IP}$ [Cylinder] |
|---|---|---|---|---|
| 17 | 2063. | −64. | −17.02 [1] | −11.09 [6] |
| 18 | 2061. | 21. | −11.54 [3] | −6.15 [6] |
| 19 | 2064. | 70. | −16.18 [6] | −12.98 [3] |
| 20 | 2071. | 182. | −15.39 [3] | −5.55 [4] |
| 21 | 2075. | −66. | −8.54 [1] | −4.45 [4] |
| 22 | 2076. | 125. | −22.52 [3] | −8.45 [6] |
| 23 | 2080. | 14. | −10.23 [6] | −7.84 [3] |
| 24 | 2079. | −56. | −19.87 [6] | −17.99 [3] |
| 25 | 2077. | −11. | −11.01 [3] | −10.44 [6] |
| 26 | 2074. | −107. | −22.43 [6] | −13.91 [3] |
| 27 | 2075. | 129. | −16.50 [3] | −16.02 [6] |
| 28 | 2077. | −31. | −12.36 [3] | −7.00 [4] |
| 29 | 2080. | 137. | −19.61 [6] | −1.80 [1] |
| 30 | 2088. | 142. | −23.31 [3] | −7.39 [4] |
| 31 | 2092. | −18. | −17.15 [4] | −7.03 [6] |
| 32 | 2090. | −53. | −21.34 [3] | −18.42 [6] |
| 33 | 2085. | −129. | −20.07 [3] | −7.98 [6] |
| 34 | 2083. | 85. | −12.82 [6] | −7.01 [4] |
| 35 | 2083. | −114. | −25.15 [3] | −8.82 [6] |

TABLE 4

COMMENTS: CONTINUOUS #1 MISFIRE - 2000 rpm idle in neutral
PROCESSING INCLUDES ACCELERATION BUT NO TOOTH ERROR CORRECTION
MEASUREMENT ANGLE −70 TO 50 DEGREES ABOUT TDC

| CYCLE | ENGINE SPEED (RPM) | ACCEL (RPM/SEC) | MOST NEGATIVE $\tilde{IP}$ [Cylinder] | SECOND MOST NEG. $\tilde{IP}$ [Cylinder] |
|---|---|---|---|---|
| 1 | 2083. | −8. | −57.68 [1] | −8.81 [6] |
| 2 | 2083. | 16. | −57.86 [1] | −8.84 [6] |
| 3 | 2083. | −17. | −54.88 [1] | −6.82 [6] |
| 4 | 2085. | 64. | −57.14 [1] | −14.74 [6] |
| 5 | 2087. | −1. | −57.59 [1] | −9.02 [4] |
| 6 | 2087. | 13. | −52.52 [1] | −7.56 [6] |
| 7 | 2084. | −105. | −56.44 [1] | −13.63 [6] |
| 8 | 2083. | 46. | −56.27 [1] | −10.96 [6] |
| 9 | 2084. | 0. | −56.80 [1] | −9.40 [6] |
| 10 | 2083. | −41. | −52.53 [1] | −12.51 [6] |
| 11 | 2081. | −12. | −55.72 [1] | −11.58 [6] |
| 12 | 2080. | −35. | −59.41 [1] | −9.16 [6] |
| 13 | 2079. | 14. | −51.12 [1] | −8.32 [6] |
| 14 | 2077. | −79. | −59.98 [1] | −10.04 [6] |
| 15 | 2075. | −7. | −58.53 [1] | −9.24 [6] |
| 16 | 2077. | 90. | −53.83 [1] | −8.24 [4] |
| 17 | 2080. | −4. | −50.06 [1] | −7.03 [6] |
| 18 | 2082. | 80. | −61.40 [1] | −13.52 [6] |
| 19 | 2083. | −26. | −56.63 [1] | −7.36 [6] |
| 20 | 2083. | −4. | −58.51 [1] | −9.57 [4] |
| 21 | 2078. | −152. | −48.74 [1] | −8.62 [3] |
| 22 | 2073. | −13. | −58.84 [1] | −15.16 [6] |
| 23 | 2076. | 121. | −57.82 [1] | −11.64 [6] |
| 24 | 2080. | −3. | −51.90 [1] | −9.93 [6] |
| 25 | 2081. | 48. | −53.73 [1] | −8.43 [6] |
| 26 | 2078. | −167. | −53.40 [1] | −18.88 [6] |
| 27 | 2075. | 78. | −51.95 [1] | −12.68 [4] |
| 28 | 2075. | −75. | −57.01 [1] | −9.10 [6] |
| 29 | 2073. | 13. | −60.12 [1] | −14.55 [6] |
| 30 | 2076. | 74. | −57.76 [1] | −8.35 [6] |
| 31 | 2075. | −115. | −50.56 [1] | −10.46 [6] |
| 32 | 2073. | 35. | −50.89 [1] | −12.51 [6] |
| 33 | 2076. | 74. | −59.48 [1] | −6.91 [6] |
| 34 | 2077. | −35. | −53.82 [1] | −8.15 [3] |
| 35 | 2076. | 0. | −58.15 [1] | −12.98 [6] |

TABLE 5

COMMENTS: NO MISFIRE - 2000 rpm idle in neutral
PROCESSING INCLUDES ACCELERATION AND TOOTH ERROR CORRECTION
CORRECTION FACTORS AT 2000 RPM - E3
MEASUREMENT ANGLE -70 TO 50 DEGREES ABOUT TDC

| CYCLE | ENGINE SPEED (RPM) | ACCEL (RPM/SEC) | MOST NEG. $\tilde{IP}$ [Cylinder] | SECOND MOST NEG. $\tilde{IP}$ [Cylinder] |
|---|---|---|---|---|
| 1 | 2075. | 88. | -5.83 [6] | -3.64 [2] |
| 2 | 2079. | 56. | -3.61 [3] | -1.82 [6] |
| 3 | 2081. | 14. | -10.77 [4] | -1.97 [1] |
| 4 | 2079. | -96. | -5.90 [6] | -5.67 [3] |
| 5 | 2074. | -87. | -17.51 [3] | -3.57 [6] |
| 6 | 2073. | 75. | -5.45 [3] | -5.09 [2] |
| 7 | 2078. | 84. | -5.65 [4] | -2.36 [2] |
| 8 | 2083. | 85. | -4.02 [1] | -3.11 [6] |
| 9 | 2079. | -217. | -15.47 [2] | -5.69 [3] |
| 10 | 2068. | -164. | -31.26 [2] | -9.51 [3] |
| 11 | 2060. | -121. | -14.75 [5] | -9.46 [6] |
| 12 | 2055. | -26. | -31.11 [3] | -12.94 [2] |
| 13 | 2058. | 127. | -7.63 [5] | -7.15 [1] |
| 14 | 2059. | -103. | -14.90 [2] | 0.46 [1] |
| 15 | 2059. | 106. | -9.57 [6] | -6.33 [2] |
| 16 | 2063. | 40. | -12.95 [3] | -10.28 [4] |
| 17 | 2063. | -64. | -11.77 [1] | -6.09 [5] |
| 18 | 2061. | 21. | -15.93 [2] | -0.96 [5] |
| 19 | 2064. | 70. | -7.28 [3] | -4.45 [6] |
| 20 | 2071. | 182. | -9.76 [2] | -5.94 [4] |
| 21 | 2075. | -66. | -18.21 [2] | -3.23 [1] |
| 22 | 2076. | 125. | -10.67 [3] | -4.81 [2] |
| 23 | 2080. | 14. | -10.46 [2] | -4.91 [4] |
| 24 | 2079. | -56. | -7.91 [6] | -6.02 [3] |
| 25 | 2077. | -11. | -13.37 [5] | -2.86 [2] |
| 26 | 2074. | -107. | -10.51 [6] | -1.99 [3] |
| 27 | 2075. | 129. | -11.04 [2] | -4.70 [3] |
| 28 | 2077. | -31. | -7.38 [4] | -3.76 [5] |
| 29 | 2080. | 137. | -11.22 [2] | -7.70 [6] |
| 30 | 2088. | 142. | -11.32 [3] | -7.78 [4] |
| 31 | 2092. | -18. | -17.54 [4] | -11.66 [2] |
| 32 | 2090. | -53. | -9.29 [3] | -7.55 [2] |
| 33 | 2085. | -129. | -8.07 [3] | -5.93 [2] |
| 34 | 2083. | 85. | -9.82 [3] | -7.40 [4] |
| 35 | 2083. | -114. | -13.16 [3] | -7.33 [2] |

TABLE 6

COMMENTS: CONTINUOUS #1 MISFIRE - 2000 rpm idle in neutral
PROCESSING INCLUDES ACCELERATION AND TOOTH ERROR CORRECTION
CORRECTION FACTORS AT 2000 RPM - E3
MEASUREMENT ANGLE -70 TO 50 DEGREES ABOUT TDC

| CYCLE | ENGINE SPEED (RPM) | ACCEL (RPM/SEC) | MOST NEG. $\tilde{IP}$ [Cylinder] | SECOND MOST NEG. $\tilde{IP}$ [Cylinder] |
|---|---|---|---|---|
| 1 | 2083. | -8. | -52.34 [1] | -1.52 [4] |
| 2 | 2083. | 16. | -52.51 [1] | -8.23 [4] |
| 3 | 2083. | -17. | -49.54 [1] | -3.94 [4] |
| 4 | 2085. | 64. | -51.80 [1] | -2.78 [6] |
| 5 | 2087. | -1. | -52.23 [1] | -9.41 [4] |
| 6 | 2087. | 13. | -47.17 [1] | -2.67 [4] |
| 7 | 2084. | -105. | -51.08 [1] | -1.63 [6] |
| 8 | 2083. | 46. | -50.93 [1] | -5.70 [4] |
| 9 | 2084. | 0. | -51.46 [1] | -5.21 [4] |
| 10 | 2083. | -41. | -47.18 [1] | -0.54 [6] |
| 11 | 2081. | -12. | -50.39 [1] | 0.36 [6] |
| 12 | 2080. | -35. | -54.08 [1] | -2.84 [4] |
| 13 | 2079. | 14. | -45.80 [1] | -0.47 [4] |
| 14 | 2077. | -79. | -54.66 [1] | 1.87 [6] |
| 15 | 2075. | -7. | -53.23 [1] | -6.63 [5] |
| 16 | 2077. | 90. | -48.53 [1] | -8.63 [4] |
| 17 | 2080. | -4. | -44.74 [1] | -3.27 [4] |
| 18 | 2082. | 80. | -56.08 [1] | -1.60 [6] |

TABLE 6-continued

COMMENTS: CONTINUOUS #1 MISFIRE - 2000 rpm idle in neutral
PROCESSING INCLUDES ACCELERATION AND TOOTH ERROR CORRECTION
CORRECTION FACTORS AT 2000 RPM - E3
MEASUREMENT ANGLE -70 TO 50 DEGREES ABOUT TDC

| CYCLE | ENGINE SPEED (RPM) | ACCEL (RPM/SEC) | MOST NEG. $\tilde{IP}$ [Cylinder] | SECOND MOST NEG. $\tilde{IP}$ [Cylinder] |
|---|---|---|---|---|
| 19 | 2083. | -26. | -51.28 [1] | -0.38 [5] |
| 20 | 2083. | -4. | -53.17 [1] | -9.96 [4] |
| 21 | 2078. | -152. | -43.40 [1] | 3.26 [3] |
| 22 | 2073. | -13. | -53.54 [1] | -3.31 [6] |
| 23 | 2076. | 121. | -52.53 [1] | -6.02 [4] |
| 24 | 2080. | -3. | -46.57 [1] | -2.32 [5] |
| 25 | 2081. | 48. | -48.40 [1] | 1.93 [4] |
| 26 | 2078. | -167. | -48.06 [1] | -6.91 [6] |
| 27 | 2075. | 78. | -46.66 [1] | -13.07 [4] |
| 28 | 2075. | -75. | -51.69 [1] | 2.78 [6] |
| 29 | 2073. | 13. | -54.83 [1] | -2.70 [4] |
| 30 | 2076. | 74. | -52.46 [1] | -8.24 [4] |
| 31 | 2075. | -115. | -45.24 [1] | 1.43 [6] |
| 32 | 2073. | 35. | -45.61 [1] | -1.71 [4] |
| 33 | 2076. | 74. | -54.19 [1] | -5.34 [4] |
| 34 | 2077. | -35. | -48.51 [1] | 3.65 [3] |
| 35 | 2076. | 0. | -52.84 [1] | -1.11 [6] |

TABLE 7

COMMENTS: NO MISFIRE - 2000 rpm idle in neutral
PROCESSING INCLUDES ACCELERATION BUT NO TOOTH ERROR CORRECTION
MEASUREMENT ANGLE -10 TO 10 DEGREES ABOUT TDC

| CYCLE | ENGINE SPEED (RPM) | ACCEL (RPM/SEC) | MOST NEG. $\tilde{IP}$ [Cylinder] | SECOND MOST NEG. $\tilde{IP}$ [Cylinder] |
|---|---|---|---|---|
| 1 | 2094. | 82. | -56.72 [2] | -54.19 [5] |
| 2 | 2098. | 76. | -56.25 [2] | -55.00 [5] |
| 3 | 2101. | 7. | -59.70 [2] | -49.68 [5] |
| 4 | 2098. | -92. | -61.82 [2] | -57.75 [5] |
| 5 | 2093. | -95. | -55.48 [2] | -47.60 [5] |
| 6 | 2092. | 75. | -60.80 [5] | -58.65 [2] |
| 7 | 2097. | 87. | -56.80 [2] | -54.76 [5] |
| 8 | 2102. | 74. | -57.81 [5] | -53.33 [2] |
| 9 | 2098. | -208. | -71.98 [2] | -49.47 [5] |
| 10 | 2087. | -175. | -62.13 [2] | -39.29 [5] |
| 11 | 2079. | -107. | -73.83 [5] | -47.38 [2] |
| 12 | 2074. | -38. | -63.02 [2] | -33.02 [5] |
| 13 | 2077. | 147. | -67.05 [2] | -52.01 [5] |
| 14 | 2079. | -109. | -71.65 [2] | -54.12 [5] |
| 15 | 2078. | 105. | -62.33 [5] | -59.50 [2] |
| 16 | 2083. | 36. | -60.17 [2] | -46.02 [5] |
| 17 | 2082. | -56. | -64.55 [5] | -57.31 [2] |
| 18 | 2081. | 7. | -72.78 [2] | -60.39 [5] |
| 19 | 2083. | 74. | -61.89 [2] | -59.23 [5] |
| 20 | 2091. | 190. | -65.70 [2] | -54.21 [5] |
| 21 | 2094. | -75. | -76.10 [2] | -60.81 [5] |
| 22 | 2095. | 130. | -63.67 [5] | -57.94 [2] |
| 23 | 2100. | 16. | -65.21 [2] | -50.38 [5] |
| 24 | 2099. | -48. | -58.34 [2] | -58.31 [5] |
| 25 | 2097. | -7. | -74.06 [5] | -59.64 [2] |
| 26 | 2094. | -114. | -53.53 [5] | -50.12 [2] |
| 27 | 2094. | 125. | -66.54 [2] | -46.28 [5] |
| 28 | 2097. | -27. | -62.44 [5] | -57.35 [2] |
| 29 | 2100. | 142. | -68.62 [2] | -63.08 [5] |
| 30 | 2108. | 121. | -57.78 [2] | -46.80 [5] |
| 31 | 2111. | -12. | -71.74 [2] | -49.90 [5] |
| 32 | 2109. | -42. | -61.26 [2] | -56.73 [5] |
| 33 | 2104. | -136. | -62.17 [2] | -59.75 [5] |
| 34 | 2102. | 74. | -68.56 [2] | -50.66 [5] |
| 35 | 2101. | -108. | -60.89 [2] | -58.58 [5] |

TABLE 8

COMMENTS: CONTINUOUS #1 MISFIRE - 2000 rpm idle in neutral
PROCESSING INCLUDES ACCELERATION BUT NO TOOTH ERROR CORRECTION
MEASUREMENT ANGLE -10 TO 10 DEGREES ABOUT TDC

| CYCLE | ENGINE SPEED (RPM) | ACCEL (RPM/SEC) | MOST NEGATIVE $\tilde{IP}$ [Cylinder] | SECOND MOST NEG. $\tilde{IP}$ [Cylinder] |
|---|---|---|---|---|
| 1 | 2105. | -7. | -57.35 [5] | -43.74 [1] |
| 2 | 2105. | 21. | -44.42 [5] | -41.68 [1] |
| 3 | 2105. | -21. | -61.10 [5] | -41.33 [1] |
| 4 | 2106. | 62. | -57.55 [5] | -44.94 [1] |
| 5 | 2108. | 2. | -57.00 [5] | -41.34 [1] |
| 6 | 2108. | 2. | -49.52 [5] | -38.48 [1] |
| 7 | 2105. | -111. | -56.63 [5] | -38.83 [1] |
| 8 | 2104. | 62. | -56.83 [5] | -40.71 [1] |
| 9 | 2106. | -2. | -49.65 [5] | -43.91 [1] |
| 10 | 2104. | -46. | -60.87 [5] | -38.12 [1] |
| 11 | 2102. | -18. | -57.34 [5] | -38.39 [1] |
| 12 | 2101. | -27. | -57.73 [5] | -41.72 [1] |
| 13 | 2101. | 14. | -44.77 [5] | -37.58 [1] |
| 14 | 2099. | -82. | -50.97 [5] | -42.47 [1] |
| 15 | 2096. | -5. | -67.08 [5] | -44.46 [1] |
| 16 | 2099. | 96. | -54.44 [5] | -39.77 [1] |
| 17 | 2101. | -14. | -50.16 [5] | -35.61 [1] |
| 18 | 2103. | 80. | -60.75 [5] | -46.03 [1] |
| 19 | 2105. | -18. | -60.30 [5] | -41.79 [1] |
| 20 | 2105. | 5. | -62.44 [5] | -44.04 [1] |
| 21 | 2100. | -162. | -54.46 [5] | -35.41 [1] |
| 22 | 2095. | -5. | -58.84 [5] | -45.60 [1] |
| 23 | 2098. | 110. | -49.98 [5] | -45.33 [1] |
| 24 | 2101. | -5. | -59.69 [5] | -36.27 [1] |
| 25 | 2102. | 44. | -52.87 [5] | -35.66 [1] |
| 26 | 2099. | -142. | -56.15 [5] | -40.05 [1] |
| 27 | 2097. | 66. | -50.42 [5] | -40.87 [1] |
| 28 | 2097. | -80. | -42.83 [1] | -36.06 [5] |
| 29 | 2095. | 11. | -56.41 [5] | -47.20 [1] |
| 30 | 2097. | 75. | -52.13 [5] | -42.32 [1] |
| 31 | 2096. | -116. | -54.35 [5] | -34.89 [1] |
| 32 | 2094. | 39. | -55.84 [5] | -36.31 [1] |
| 33 | 2097. | 75. | -61.12 [5] | -45.93 [1] |
| 34 | 2098. | -43. | -47.03 [5] | -39.89 [1] |
| 35 | 2097. | -2. | -51.22 [5] | -42.56 [1] |

TABLE 9

COMMENTS: NO MISFIRE - 2000 rpm idle in neutral
PROCESSING INCLUDES ACCELERATION BUT NO TOOTH ERROR CORRECTION
CORRECTION FACTORS AT 2000 RPM
MEASUREMENT ANGLE -10 TO 10 DEGREES ABOUT TDC

| CYCLE | ENGINE SPEED (RPM) | ACCEL (RPM/SEC) | MOST NEGATIVE $\tilde{IP}$ [Cylinder] | SECOND MOST NEG. $\tilde{IP}$ [Cylinder] |
|---|---|---|---|---|
| 1 | 2094. | 82. | -8.29 [6] | -2.61 [1] |
| 2 | 2098. | 76. | -8.49 [3] | -4.51 [4] |
| 3 | 2101. | 7. | -17.42 [1] | -3.18 [1] |
| 4 | 2098. | -92. | -6.82 [3] | -5.21 [6] |
| 5 | 2093. | -95. | -23.89 [3] | -5.11 [6] |
| 6 | 2092. | 75. | -8.54 [3] | -7.43 [4] |
| 7 | 2097. | 87. | -9.83 [1] | -1.04 [3] |
| 8 | 2102. | 74. | -8.10 [1] | -4.29 [6] |
| 9 | 2098. | -208. | -11.81 [4] | -10.96 [2] |
| 10 | 2087. | -175. | -37.92 [3] | -1.98 [2] |
| 11 | 2079. | -107. | -12.05 [6] | -11.50 [5] |
| 12 | 2074. | -38. | -36.66 [3] | -3.66 [2] |
| 13 | 2077. | 147. | -10.00 [1] | -6.04 [4] |
| 14 | 2079. | -109. | -12.20 [2] | -1.03 [1] |
| 15 | 2078. | 105. | -9.47 [6] | -4.72 [3] |
| 16 | 2083. | 36. | -15.48 [3] | -13.64 [4] |
| 17 | 2082. | -56. | -13.20 [1] | -2.54 [5] |
| 18 | 2081. | 7. | -13.32 [2] | -4.22 [3] |
| 19 | 2083. | 74. | -6.15 [3] | -6.12 [6] |

TABLE 9-continued

COMMENTS: NO MISFIRE - 2000 rpm idle in neutral
PROCESSING INCLUDES ACCELERATION BUT NO TOOTH ERROR CORRECTION
CORRECTION FACTORS AT 2000 RPM
MEASUREMENT ANGLE -10 TO 10 DEGREES ABOUT TDC

| CYCLE | ENGINE SPEED (RPM) | ACCEL (RPM/SEC) | MOST NEGATIVE $\tilde{IP}$ [Cylinder] | SECOND MOST NEG. $\tilde{IP}$ [Cylinder] |
|---|---|---|---|---|
| 20 | 2091. | 190. | -9.25 [4] | -5.94 [2] |
| 21 | 2094. | -75. | -15.90 [2] | -4.44 [1] |
| 22 | 2095. | 130. | -17.08 [3] | -1.25 [5] |
| 23 | 2100. | 16. | -13.11 [4] | -4.71 [2] |
| 24 | 2099. | -48. | -9.80 [6] | -8.11 [3] |
| 25 | 2097. | -7. | -11.10 [5] | -3.16 [3] |
| 26 | 2094. | -114. | -13.20 [6] | -5.72 [3] |
| 27 | 2094. | 125. | -7.18 [3] | -6.54 [2] |
| 28 | 2097. | -27. | -11.80 [4] | -1.72 [3] |
| 29 | 2100. | 142. | -8.34 [2] | -4.69 [6] |
| 30 | 2108. | 121. | -14.75 [3] | -8.28 [4] |
| 31 | 2111. | -12. | -24.17 [4] | -10.54 [2] |
| 32 | 2109. | -42. | -12.04 [3] | -4.13 [6] |
| 33 | 2104. | -136. | -15.46 [3] | -0.87 [1] |
| 34 | 2102. | 74. | -11.91 [4] | -8.04 [2] |
| 35 | 2101. | -108 | -20.40 [3] | -0.02 [2] |

TABLE 10

COMMENTS: CONTINUOUS #1 MISFIRE - 2000 rpm idle in neutral
PROCESSING INCLUDES ACCELERATION AND TOOTH ERROR CORRECTION
CORRECTION FACTORS AT 2000 RPM
MEASUREMENT ANGLE -10 TO 10 DEGREES ABOUT TDC

| CYCLE | ENGINE SPEED (RPM) | ACCEL (RPM/SEC) | MOST NEGATIVE $\tilde{IP}$ [Cylinder] | SECOND MOST NEG. $\tilde{IP}$ [Cylinder] |
|---|---|---|---|---|
| 1 | 2105. | -7. | -71.28 [1] | -5.74 [4] |
| 2 | 2105. | 21. | -69.21 [1] | -16.16 [4] |
| 3 | 2105. | -21. | -68.89 [1] | -5.72 [4] |
| 4 | 2106. | 62. | -72.47 [1] | -1.50 [4] |
| 5 | 2108. | 2. | -68.97 [1] | -13.12 [4] |
| 6 | 2108. | 2. | -66.12 [1] | -6.83 [4] |
| 7 | 2105. | -111. | -66.46 [1] | 0.30 [3] |
| 8 | 2104. | 62. | -68.18 [1] | -9.89 [4] |
| 9 | 2106. | -2. | -71.47 [1] | -10.46 [4] |
| 10 | 2104. | -46. | -65.68 [1] | 2.21 [5] |
| 11 | 2102. | -8. | -65.88 [1] | 3.75 [4] |
| 12 | 2101. | -27. | -69.18 [1] | -7.62 [4] |
| 13 | 2101. | 14. | -65.00 [1] | -8.05 [4] |
| 14 | 2099. | -82. | -69.91 [1] | 5.14 [4] |
| 15 | 2096. | -5. | -71.77 [1] | -8.32 [4] |
| 16 | 2099. | 96. | -67.08 [1] | -12.57 [4] |
| 17 | 2101. | -14. | -63.06 [1] | -7.23 [4] |
| 18 | 2103. | 80. | -73.47 [1] | 2.10 [5] |
| 19 | 2105. | -18. | -69.34 [1] | -4.96 [4] |
| 20 | 2105. | 5. | -71.57 [1] | -11.08 [4] |
| 21 | 2100. | -162. | -62.95 [1] | -0.24 [3] |
| 22 | 2095. | -5. | -72.89 [1] | 0.31 [4] |
| 23 | 2098. | 110. | -72.61 [1] | -7.61 [4] |
| 24 | 2101. | -5. | -63.72 [1] | -5.38 [4] |
| 25 | 2102. | 44. | -63.10 [1] | -2.70 [4] |
| 26 | 2099. | -142. | -67.55 [1] | -4.19 [4] |
| 27 | 2097. | 66. | -68.16 [1] | -15.79 [4] |
| 28 | 2097. | -80. | -70.22 [1] | -0.78 [4] |
| 29 | 2095. | 11. | -74.47 [1] | 1.89 [4] |
| 30 | 2097. | 75. | -69.61 [1] | -12.77 [4] |
| 31 | 2096. | -116. | -62.30 [1] | -2.52 [4] |
| 32 | 2094. | 39. | -63.54 [1] | -6.76 [4] |
| 33 | 2097. | 75. | -73.22 [1] | -5.75 [4] |
| 34 | 2098. | -43. | -67.29 [1] | -3.01 [3] |
| 35 | 2097. | -2. | -69.89 [1] | -2.21 [4] |

TABLE 11

NO MISFIRE - 5000 RPM IN NEUTRAL
VEHICLE ORIGINAL EQUIPMENT
TOOTHED WHEEL AND PICK-UP
USED FOR ALL DATA COLLECTION

| CYCLE | ENGINE SPEED (RPM) | ACCEL (RPM/SEC) | MOST NEGATIVE $\bar{IP}$ [Cylinder] | SECOND MOST NEG. $\bar{IP}$ [Cylinder] |
|---|---|---|---|---|
| 1 | 4984. | −41. | −11.03 [6] | −8.95 [3] |
| 2 | 4983. | −21. | −23.25 [5] | −7.24 [1] |
| 3 | 4984. | 114. | −23.79 [3] | −1.18 [2] |
| 4 | 4986. | 16. | −18.55 [1] | −1.05 [2] |
| 5 | 4985. | −47. | −9.42 [2] | −8.11 [6] |
| 6 | 4985. | 41. | −8.98 [4] | −2.37 [6] |
| 7 | 4986. | 10. | −9.11 [1] | −4.00 [3] |
| 8 | 4986. | 31. | −10.71 [5] | −4.02 [4] |
| 9 | 4987. | 36. | −19.28 [5] | −10.96 [2] |
| 10 | 4987. | −93. | −23.84 [5] | −3.01 [6] |
| 11 | 4987. | 109. | −11.91 [4] | −11.12 [1] |
| 12 | 4988. | 0. | −26.42 [6] | −10.80 [2] |
| 13 | 4989. | 83. | −10.32 [5] | −1.85 [6] |
| 14 | 4992. | 130. | −11.77 [6] | −5.86 [3] |
| 15 | 4994. | 31. | −13.49 [1] | −6.97 [6] |
| 16 | 4994. | 10. | −12.90 [2] | −8.20 [6] |
| 17 | 4996. | 156. | −11.63 [2] | −5.10 [1] |
| 18 | 4997. | −109. | −17.73 [1] | −13.78 [3] |
| 19 | 4996. | 99. | −21.20 [2] | −8.16 [6] |
| 20 | 4998. | 26. | −21.79 [3] | −9.44 [3] |
| 21 | 5000. | 130. | −11.70 [3] | −9.69 [5] |
| 22 | 4999. | −193. | −16.06 [4] | −11.45 [3] |
| 23 | 4998. | 83. | −4.68 [3] | −2.10 [6] |
| 24 | 4999. | 26. | −7.63 [2] | −5.77 [3] |
| 25 | 5000. | 63. | −13.45 [2] | −6.85 [3] |
| 26 | 5001. | 47. | −17.78 [3] | −2.97 [6] |
| 27 | 5003. | 57. | −15.14 [2] | −2.08 [3] |
| 28 | 5001. | −172. | −18.60 [4] | −11.90 [5] |
| 29 | 5000. | 21. | −15.89 [4] | −10.39 [3] |
| 30 | 5001. | 89. | −7.73 [3] | −7.45 [5] |
| 31 | 4999. | −203. | −16.69 [4] | −15.90 [3] |
| 32 | 4997. | −36. | −14.17 [4] | −2.82 [5] |
| 33 | 4995. | −73. | −28.26 [2] | −9.46 [6] |
| 34 | 4992. | −166. | −23.59 [2] | −1.90 [6] |
| 35 | 4991. | 31. | −23.77 [5] | 1.75 [3] |

TABLE 12

CONTINUOUS #1 MISFIRE - 5000 RPM IN NEUTRAL
VEHICLE ORIGINAL EQUIPMENT
TOOTHED WHEEL AND PICK-UP
USED FOR ALL DATA COLLECTION

| CYCLE | ENGINE SPEED (RPM) | ACCEL (RPM/SEC) | MOST NEGATIVE $\bar{IP}$ [Cylinder] | SECOND MOST NEG. $\bar{IP}$ [Cylinder] |
|---|---|---|---|---|
| 1 | 4991. | −31. | −123.24 [1] | −27.59 [6] |
| 2 | 4990. | −83. | −122.31 [1] | −9.09 [6] |
| 3 | 4990. | 109. | −126.94 [1] | −27.09 [6] |
| 4 | 4990. | −78. | −134.53 [1] | −12.08 [6] |
| 5 | 4990. | 72. | −132.40 [1] | −17.59 [6] |
| 6 | 4991. | 41. | −130.04 [1] | −10.37 [6] |
| 7 | 4990. | −52. | −135.21 [1] | −11.91 [6] |
| 8 | 4988. | −72. | −117.89 [1] | −10.33 [6] |
| 9 | 4988. | 83. | −129.76 [1] | −14.07 [6] |
| 10 | 4989. | −10. | −128.97 [1] | −13.15 [6] |
| 11 | 4988. | −36. | −127.26 [1] | −29.20 [6] |
| 12 | 4990. | 145. | −122.45 [1] | −11.33 [6] |
| 13 | 4992. | 10. | −131.61 [1] | −8.24 [6] |
| 14 | 4993. | 83. | −128.25 [1] | −25.51 [6] |
| 15 | 4994. | 5. | −119.61 [1] | −22.23 [6] |
| 16 | 4995. | 93. | −125.96 [1] | −6.17 [6] |
| 17 | 4997. | 42. | −130.14 [1] | −14.05 [6] |
| 18 | 4997. | 5. | −126.33 [1] | −18.60 [6] |
| 19 | 4999. | 182. | −128.85 [1] | −23.10 [6] |
| 20 | 5001. | −26. | −124.82 [1] | −5.52 [6] |
| 21 | 5003. | 156. | −128.35 [1] | −21.50 [6] |
| 22 | 5004. | −84. | −126.12 [1] | −23.72 [6] |
| 23 | 5004. | 94. | −123.82 [1] | −13.03 [6] |
| 24 | 5005. | 5. | −131.60 [1] | −7.54 [6] |
| 25 | 5005. | 10. | −124.30 [1] | −11.48 [6] |
| 26 | 5005. | 0. | −121.21 [1] | −10.22 [6] |
| 27 | 5005. | 42. | −127.41 [1] | −13.68 [6] |
| 28 | 5005. | 89. | −137.75 [1] | −25.19 [6] |
| 29 | 5005. | −115. | −119.73 [1] | −13.35 [6] |
| 30 | 5004. | 31. | −122.96 [1] | −7.35 [6] |
| 31 | 5005. | 37. | −129.68 [1] | −27.36 [6] |
| 32 | 5004. | −156. | −126.81 [1] | −7.30 [6] |
| 33 | 5001. | −21. | −116.60 [1] | −22.69 [6] |
| 34 | 5001. | −31. | −117.19 [1] | −8.18 [6] |
| 35 | 5000. | −26. | −126.57 [1] | −6.43 [6] |

TABLE 13

ISOLATED #1 MISFIRE - 5000 RPM IN NEUTRAL
VEHICLE ORIGINAL EQUIPMENT
TOOTHED WHEEL AND PICK-UP
USED FOR ALL DATA COLLECTION

| CYCLE | ENGINE SPEED (RPM) | ACCEL (RPM/SEC) | MOST NEGATIVE $\bar{IP}$ [Cylinder] | SECOND MOST NEG. $\bar{IP}$ [Cylinder] |
|---|---|---|---|---|
| 1 | 5004. | 199. | −9.97 [4] | −3.53 [3] |
| 2 | 5006. | −16. | −9.36 [3] | −4.38 [2] |
| 3 | 5006. | 79. | −7.01 [5] | −5.44 [4] |
| 4 | 5008. | 37. | −12.42 [5] | −4.96 [2] |
| 5 | 5007. | −79. | −13.91 [4] | −8.53 [3] |
| 6 | 5006. | 0. | −10.32 [5] | −10.17 [6] |
| 7 | 5007. | 63. | −16.02 [5] | −14.53 [1] |
| 8 | 5008. | 16. | −16.14 [3] | −11.76 [5] |
| 9 | 5007. | −110. | −24.90 [6] | −7.48 [1] |
| 10 | 5001. | −391. | −97.42 [1] | −30.26 [6] |
| 11 | 4989. | −564. | −113.96 [1] | 5.05 [2] |
| 12 | 4983. | 10. | −14.50 [4] | −12.80 [1] |
| 13 | 4983. | 10. | −21.48 [2] | −4.46 [1] |
| 14 | 4985. | 124. | −10.88 [2] | −5.08 [1] |
| 15 | 4987. | 41. | −9.16 [5] | −1.68 [1] |
| 16 | 4988. | 72. | −13.76 [1] | −8.19 [5] |
| 17 | 4988. | −62. | −8.64 [6] | −7.05 [2] |
| 18 | 4985. | −165. | −29.74 [4] | −2.07 [5] |
| 19 | 4985. | 134. | −8.17 [1] | −7.29 [5] |
| 20 | 4986. | −78. | −7.92 [3] | −7.27 [4] |
| 21 | 4986. | 134. | −4.94 [3] | −4.58 [2] |
| 22 | 4987. | −52. | −16.67 [5] | −6.86 [3] |
| 23 | 4987. | −5. | −7.88 [2] | −4.93 [1] |
| 24 | 4984. | −238. | −25.70 [4] | −16.19 [3] |
| 25 | 4979. | −144. | −19.16 [4] | −11.18 [5] |
| 26 | 4978. | 62. | −8.06 [5] | −4.45 [3] |
| 27 | 4978. | −103. | −9.38 [1] | −5.07 [2] |
| 28 | 4975. | −98. | −8.49 [4] | −6.25 [6] |
| 29 | 4974. | −46. | −16.47 [4] | −10.36 [3] |
| 30 | 4973. | 15. | −9.64 [2] | −8.43 [3] |
| 31 | 4971. | −210. | −18.60 [5] | −6.56 [2] |
| 32 | 4968. | −66. | −13.70 [5] | −6.30 [2] |
| 33 | 4967. | 20. | −16.56 [4] | −4.78 [5] |
| 34 | 4964. | −301. | −41.95 [3] | −30.71 [4] |
| 35 | 4960. | 41. | −14.21 [5] | −1.72 [6] |

We claim:

1. A method for determining the performance of a driving element which is coupled to a rotating element to drive the rotating element, the method comprising generating first data from the rotating element to provide a baseline measure of the driving element's performance when the driving element is performing to an arbitrarily established performance norm, storing the first data, subsequently generating second data from the rotating element representative of the driving element's performance, removing from the second data the first data to establish third data, establishing a threshold result indicative of unsatisfactory performance by the driving element, and comparing the third data to the threshold to determine the performance of the driving element.

2. A method for removing acceleration effects from a measure of a first driving element which is coupled to a rotating element to drive the rotating element, the method comprising the steps of determining from the rotating element a first measure of the first driving element, storing first data representative of that first measure, subsequently determining a second measure of the first driving element, generating second data representative of that second measure, removing the first data from the second data to establish first acceleration data, and removing the first acceleration data from the second data.

3. The method of claim 2 wherein the first data is generated during a first operating cycle of the first driving element and the second data is generated during an operating cycle of the first driving element immediately following the first operating cycle.

4. The method of claim 2 or 3 wherein there is at least one additional driving element which is coupled to the rotating element to drive the rotating element, the method further comprising the steps of attributing a portion of the first acceleration data to each said additional driving element, generating additional data representative of the measures of each said additional driving element, and removing from the additional data attributable to each said additional driving element the portion of the first acceleration data attributed to a respective said additional driving element.

5. The method of claim 4 wherein the step of attributing a portion of the first acceleration data to each said additional driving element comprises dividing the first acceleration data by the number of driving elements which are intended to contribute to the drive to the rotating element between the first and second measures of the first driving element and attributing the quotient of said division to each said additional driving element which is intended to contribute to the drive to the rotary element between the first and second measures of the first driving element.

6. The method of claim 2 wherein the first data is generated during a first operating cycle of the first driving element and the second data is generated during a second operating cycle of the first driving element following the first operating cycle and further comprising the steps of determining a third measure of the first driving element during a third operating cycle of the first driving element subsequent to the second, generating third data representative of that third measure, removing the second data from the third data to establish second acceleration data, and removing the second acceleration data from the third data.

7. The method of claim 6 wherein there is at least one additional driving element which experiences an operating cycle between the second and third operating cycles of the first driving element, the method further comprising the steps of attributing a portion of the second acceleration data to each said additional driving element which experiences an operating cycle between the second and third operating cycles of the first driving element, generating additional data representative of the measures of each said additional driving element which experiences an operating cycle between the second and third operating cycles of the first driving element, and removing from the additional data attributable to each said additional driving element between the second and third operating cycles of the first driving element the portion of the second acceleration data attributed to a respective said additional driving element between the second and third operating cycles of the first driving element.

8. The method of claim 7 wherein the step of attributing a portion of the second acceleration data to each said additional driving element between the second and third operating cycles of the first driving element comprises dividing the second acceleration data by the number of driving elements which experience operating cycles between the second and third operating cycles of the first driving element and attributing the quotient of said division to each said driving element which experiences an operating cycle between the second and third operating cycles of the first driving element.

9. The method of claim 2 and further comprising determining a baseline measure of the first driving element's performance when the first driving element is performing to an arbitrarily established performance norm, storing baseline data representative of that baseline measure, generating data representative of the measure of the performance of the first driving element, and then removing the baseline data from the data representative of the measure of performance of the first driving element.

10. The method of claim 2, 3, 6, 7, 8 or 9 wherein there is at least one additional driving element which is coupled to the rotating element to drive the rotating element, and further comprising the steps of determining a baseline measure of the performance of each said additional driving element when said additional driving element is performing to an arbitrarily established performance norm, storing baseline data representative of the baseline measure of the performance of each said additional driving element, generating additional data representative of the measures of performance of each said additional driving element, and then removing the baseline data representative of the baseline measure of the performance of a respective said additional driving element from the additional data attributable to the performance of the respective said additional driving element.

11. The method of claim 4 and further comprising the steps of determining a baseline measure of the performance of each said additional driving element when said additional driving element is performing to an arbitrarily established performance norm, storing baseline data representative of the baseline measure of the performance of each said additional driving element, generating additional data representative of the measures of performance of each said additional driving element and then removing the baseline data representative of the baseline measure of the performance of a respective said additional driving element from the additional data attributable to the performance of the respective said additional driving element.

12. The method of claim 5 and further comprising the steps of determining a baseline measure of the performance of each said additional driving element when said additional driving element is performing to an arbitrarily established performance norm, storing baseline data representative of the baseline measure of the performance of each said additional driving element, generating additional data representative of the measures of performance of each said additional driving element and then removing the baseline data representative of the baseline measure of the performance of a respective said additional driving element from the additional data attributable to the performance of the respective said additional driving element.

13. The method of claim 2, 3, 6, 7, 8 or 9 wherein each driving element comprises a cylinder of an internal combustion engine, the cylinders of which are designed to undergo combustion events in an established firing order, an operating cycle comprising a combustion event, and wherein there is at least one additional cylinder which experiences a combustion event after the first combustion event in the first cylinder, and further comprising the steps of determining a baseline measure of the pressure performance associated with each said cylinder when said cylinder is performing to an arbitrarily established performance norm, generating and storing baseline data representative of the baseline pressure performance measure associated with each said cylinder, generating additional data representative of the combustion pressure performance measures of each said cylinder, and then removing the baseline data representative of the baseline pressure performance measure associated with a respective said cylinder from the additional data representative of the combustion pressure performance measures of each said cylinder.

14. The method of claim 4 wherein each driving element comprises a cylinder of an internal combustion engine, the cylinders of which are designed to undergo combustion events in an established firing order, an operating cycle comprising a combustion event, and further comprising the steps of generating additional data representative of a measure of combustion pressure performance of each said cylinder, determining a baseline measure of the pressure performance associated with each said cylinder when said cylinder is performing to an arbitrarily established performance norm, generating and storing baseline data representative of the baseline pressure performance measures associated with each said cylinder, and then removing the baseline data representative of the baseline pressure performance measure associated with a respective said cylinder from the additional data representative of the combustion pressure performance measures of each said cylinder.

15. The method of claim 5 wherein each driving element comprises a cylinder of an internal combustion engine, the cylinders of which are designed to undergo combustion events in an established firing order, an operating cycle comprising a combustion event, and further comprising the steps of generating additional data representative of a measure of combustion pressure performance of each said cylinder, determining a baseline measure of the pressure performance associated with each said cylinder when said cylinder is performing to an arbitrarily established performance norm, generating and storing baseline data representative of the baseline pressure performance measure associated with each said cylinder, and then removing the baseline data representative of the baseline pressure performance measure associated with a respective said cylinder from the additional data representative of the combustion pressure performance measures of each said cylinder.

16. The method of claim 1, 2, 3, 6, 7, 8 or 9 wherein each driving element comprises a cylinder of an internal combustion engine, the cylinders of which are designed to undergo combustion events in an established firing order, an operating cycle comprising a combustion event, and wherein the step of determining a measure of a cylinder comprises the steps of establishing an interval about top dead center of the cylinder, and adjusting the width of the interval, the width of the interval being adjusted relatively wider as the engine's crankshaft speed increases and being adjusted relatively narrower as the engine's crankshaft speed decreases.

17. The method of claim 4 wherein each driving element comprises a cylinder of an internal combustion engine, the cylinders of which are designed to undergo combustion events in an established firing order, an operating cycle comprising a combustion event, and wherein the step of determining a measure of a cylinder comprises the steps of establishing an interval about top dead center of the cylinder, and adjusting the width of the interval, the width of the interval being adjusted relatively wider as the engine's crankshaft speed increases and being adjusted relatively narrower as the engine's crankshaft speed decreases.

18. The method of claim 5 wherein each driving element comprises a cylinder of an internal combustion engine, the cylinders of which are designed to undergo combustion events in an established firing order, an operating cycle comprising a combustion event, and wherein the step of determining a measure of a cylinder comprises the steps of establishing an interval about top dead center of the cylinder, and adjusting the width of the interval, the width of the interval being adjusted relatively wider as the engine's crankshaft speed increases and being adjusted relatively narrower as the engine's crankshaft speed decreases.

19. The method of claim 10 wherein each driving element comprises a cylinder of an internal combustion engine, the cylinders of which are designed to undergo combustion events in an established firing order, an operating cycle comprising a combustion event, and wherein the step of determining a measure of a cylinder comprises the steps of establishing an interval about top dead center of the cylinder, and adjusting the width of the interval, the width of the interval being adjusted relatively wider as the engine's crankshaft speed increases and being adjusted relatively narrower as the engine's crankshaft speed decreases.

20. The method of claim 11 wherein each driving element comprises a cylinder of an internal combustion engine, the cylinders of which are designed to undergo combustion events in an established firing order, an operating cycle comprising a combustion event, and wherein the step of determining a measure of a cylinder comprises the steps of establishing an interval about top dead center of the cylinder, and adjusting the width of the interval, the width of the interval being adjusted relatively wider as the engine's crankshaft speed increases and being adjusted relatively narrower as the engine's crankshaft speed decreases.

21. The method of claim 12 wherein each driving element comprises a cylinder of an internal combustion engine, the cylinders of which are designed to undergo combustion events in an established firing order, an operating cycle comprising a combustion event, and wherein the step of determining a measure of a cylinder comprises the steps of establishing an interval about top dead center of the cylinder, and adjusting the width of the interval, the width of the interval being adjusted relatively wider as the engine's crankshaft speed increases and being adjusted relatively narrower as the engine's crankshaft speed decreases.

22. A method for removing acceleration effects from measures of first and second driving elements which are coupled to a rotating element to drive the rotating element, the method comprising the steps of determining a first measure of the first driving element, storing first data representative of that first measure, determining a second measure of the second driving element, generating second data representative of that second measure, removing the first data from the second data to establish acceleration data, and removing the acceleration data from the second data.

23. The method of claim 22 wherein there is at least one additional driving element which is coupled to the rotating element to drive the rotating element, the method further comprising the steps of attributing a portion of the acceleration data to each of said first, second and additional driving elements, generating additional data representative of the measures of each said additional driving element, and removing from the additional data attributable to each said additional driving element the portion of the acceleration data attributed to a respective said additional driving element.

24. The method of claim 23 wherein the steps of removing the acceleration data from the second data and from the additional data attributable to each said additional driving element comprise dividing the acceleration data by the number of driving elements and attributing the quotient of said division to each driving element.

25. The method of claim 22, 23 or 24 and further comprising generating additional data from the rotating element to provide a baseline measure of the second driving element, storing the additional data representative of that baseline measure, and then removing the additional data from the second data.

26. The method of claim 23 or 24, and further comprising the steps of generating additional data from the rotating element to provide a baseline measure of each said additional driving element, storing the additional data representative of the baseline measure of each said additional driving element, generating additional data representative of the measures of each said additional driving element, and then removing the additional data representative of the baseline measure of a respective said additional driving element from the additional data attributable to the respective said additional driving element.

27. The method of claim 25 and further comprising the steps of generating additional data from the rotating element to provide a baseline measure of each said additional driving element, storing additional data representative of the baseline measure of each said additional driving element, generating additional data representative of the measures of each said additional driving element, and then removing the additional data representative of the baseline measure of a respective said additional driving element from the additional data attributable to the respective said additional driving element.

28. The method of claim 22, 23 or 24 wherein each driving element comprises a cylinder of an internal combustion engine, the cylinders of which are designed to undergo combustion events in an established firing order, wherein the step of determining a measure of a cylinder comprises the steps of establishing an interval about top dead center of the cylinder, and adjusting the width of the interval, the width of the interval being adjusted relatively wider as the engine's crankshaft speed increases and being adjusted relatively narrower as the engine's crankshaft speed decreases.

29. The method of claim 25 wherein each driving element comprises a cylinder of an internal combustion engine, the cylinders of which are designed to undergo combustion events in an established firing order, wherein the step of determining a measure of a cylinder comprises the steps of establishing an interval about top dead center of the cylinder, and adjusting the width of the interval, the width of the interval being adjusted relatively wider as the engine's crankshaft speed increases and being adjusted relatively narrower as the engine's crankshaft speed decreases.

30. The method of claim 26 wherein each driving element comprises a cylinder of an internal combustion engine, the cylinders of which are designed to undergo combustion events in an established firing order, wherein the step of determining a measure of a cylinder comprises the steps of establishing an interval about top dead center of the cylinder, and adjusting the width of the interval, the width of the interval being adjusted relatively wider as the engine's crankshaft speed increases and being adjusted relatively narrower as the engine's crankshaft speed decreases.

31. The method of claim 27 wherein each driving element comprises a cylinder of an internal combustion engine, the cylinders of which are designed to undergo combustion events in an established firing order, wherein the step of determining a measure of a cylinder comprises the steps of establishing an interval about top dead center of the cylinder, and adjusting the width of the interval, the width of the interval being adjusted relatively wider as the engine's crankshaft speed increases and being adjusted relatively narrower as the engine's crankshaft speed decreases.

* * * * *